INVENTORS
NORBERT KITZ
JOHN GEORGE LLOYD
BY JAMES JOHN DRAGE
Pennie, Edmonds, Morton, Barrows and Taylor
ATTORNEYS Jan. 3, 1967 N. KITZ ETAL 3,296,425

PORTABLE DECIMAL CALCULATING MACHINE INCLUDING PULSE OPERATED COUNTING DEVICES

Filed Sept. 25, 1962 5 Sheets-Sheet 2

INVENTORS
NORBERT KITZ
JOHN GEORGE LLOYD
JAMES JOHN DRAGE
BY Pennie, Edmonds
Morton, Barrows and Taylor
ATTORNEYS INVENTORS
NORBERT KITZ
JOHN GEORGE LLOYD
JAMES JOHN DRAGE
BY Pennie, Edmonds, Morton, Barrows and Taylor
ATTORNEYS INVENTORS
NORBERT KITZ
JOHN GEORGE LLOYD
JAMES JOHN DRAGE
BY Pennie, Edmonds,
Morton, Barrows and Taylor
ATTORNEYS

PORTABLE DECIMAL CALCULATING MACHINE INCLUDING PULSE OPERATED COUNTING DEVICES

Filed Sept. 25, 1962 5 Sheets-Sheet 5

INVENTORS
NORBERT KITZ
JOHN GEORGE LLOYD
JAMES JOHN DRAGE
BY Pennie, Edmonds, Morton, Barrows and Taylor
ATTORNEYS United States Patent Office 3,296,425

Patented Jan. 3, 1967

3,296,425

PORTABLE DECIMAL CALCULATING MACHINE INCLUDING PULSE OPERATED COUNTING DEVICES

Norbert Kitz, John George Lloyd, and James John Drage, London, England, assignors to Bell Punch Company Limited, London, England, a British company Filed Sept. 25, 1962, Ser. No. 226,064
Claims priority, application Great Britain, Oct. 2, 1961, 35,559/61
34 Claims. (Cl. 235—160)

This invention relates to calculating machines and one of its objects is to provide a calculating machine which is suitable for use as a readily portable office-desk calculating machine. It is a further object of the invention to provide improved apparatus suitable for use in readily portable office-desk electronically operated calculating machines.

From one aspect the invention comprises a calculating machine including a plurality of pulse-operated counting devices, a plurality of gate circuits, one associated with each counting device, an electric pulse generator, an electrical timing device operative to open the gate circuits in sequence, a common pulse entry line connected to an input of each of the gate circuits, and means for controlling the number of pulses supplied by the pulse generator to the common pulse entry line while each of said gate circuits is open. The arrangement is such that pulses from the pulse generator are operative to increase the number registered by any counting device when its associated gate circuit is open.

From another aspect the invention comprises a calculating machine including a plurality of pulse-operated counting devices, a plurality of orders of keys, an electric pulse generator, and first and second timing devices, wherein the first timing device enables the pulse generator to be controlled by the orders of keys in sequence, wherein the second timing device enables the pulse generator to apply pulses to the counting devices in sequence, and wherein means are provided for altering the relative timing of the first and second timing devices, whereby each order of keys may be used to control the application of pulses to a plurality of different counting devices.

From yet another aspect the invention comprises a calculating machine including a plurality of orders of keys, a plurality of key gates one associated with each order of keys, a plurality of counting devices, a plurality of counting device gates, one associated with each counting device, an electric pulse generator, a first timing device operative to open said key gates in sequence, a second timing device operative to open said counting device gates in sequence, and a common pulse entry line, wherein the actuation of a key in any order causes a number of pulses related to the value of the actuated key to be applied to the common entry line by the pulse generator while the key gate associated with the order of the actuated key is open, and wherein during a cycle of operation of the machine the content of each counting device is increased in dependence on the number of pulses appearing on the common entry line while the counting device gate associated with that counting device is open.

Means may be provided for stepping the first and second timing devices either together or one at a time and, in particular, one pulse from the pulse generator may be operative during each cycle of operation of the pulse generator to move each timing device forward one step. Preferably the first timing device completes one cycle of operation in a number of steps which is one less than the number of steps required to complete a cycle of operation of the second timing device. Further means may be provided which normally prevent the first timing device from being stepped when the second timing device is on its first step. Thus under normal conditions, if the two timing devices are initially in step and are provided with similar driving pulses, for example one pulse from the pulse generator during each cycle of its operation they will remain in step. However, if an additional driving pulse is applied to the first timing device while the second timing device is on its first step, the relationship between the two timing devices will be changed by one step. In this way it is possible to arrange for any step of the first timing device to occur at the same time as a particular step of the second timing device. Thus by this means pulses can be inserted in each of the counting devices under the control of any of the orders of keys. This facility is useful in a machine for performing multiplication and enables the various partial products formed during a calculation to be entered into the correct parts of the register. To enable multiplication to be performed by commencing a calculation with the highest digit of the multiplier, the machine is arranged to enter each successive partial product into the register with a shift of one place to the right. However, if the means defined above are used for this purpose, it would be possible for the orders of keys representing the lower denominational orders of the multiplicand to control the entry of pulses into the higher orders of the register. This would give an incorrect answer and accordingly it is an object of a further aspect of this invention to avoid this disadvantage.

From this aspect the invention consists in a calculating machine including a plurality of groups of keys each group representing a denominational order and each key representing a digit, a plurality of counting devices each representing a denominational order, means for associating the groups of keys with counting devices representing successively lower denominational orders during successive cycles of operation of the machine, means for supplying to each counting device during each cycle of operation of the machine a number of electrical pulses related to the digit represented by any actuated key in the group of keys associated with that counting device during that cycle of operation of the machine and means for inhibiting the supply of the pulses to any counting device which is associated with a group of keys representing a denominational order lower than the order represented by that counting device.

From yet another aspect the invention consists in a calculating machine including a plurality of groups of latched keys each group representing a denominational order and each key representing a digit, a plurality of electric-pulse-operated counting devices each representing a denominational order, an electric pulse generator, and a single bank of multiplier keys, wherein the machine is operative to multiply by repetitive addition a multiplicand entered on said orders of latched keys by a multiplier digit entered in the bank of multiplier keys, wherein, when the first digit of the multiplier is entered in the multiplier keys, each group of keys is operative to control the number of pulses applied to the counting device representing the same denominational order as that group of keys, and wherein when the second digit of the multiplier is entered in the multiplier keys, the group of keys representing the lowest denominational order is rendered inoperative, and each other group of keys is operative to control the number of pulses applied to the counting device representing the denominational order below that represented by that group of keys. When further digits of the multiplier are entered in the multiplier keys, the lower groups of keys are successively rendered inoperative and the remaining groups of keys are associated with counting devices representing successively lower denominational orders. Means may be provided, in accordance with a subsidiary feature of the invention, for preventing the machine from accepting further digits of the multiplier after the highest order group of keys has been associated with the lowest order counting device.

It is a further object of the invention to provide in or for a calculating machine simple means for controlling the entry of pulses into a register.

From this aspect the invention consists in a calculating machine including a multidenominational register, a plurality of groups of keys each group representing a denominational order and each key representing a digit, a plurality of gates one associated with each group of keys, means for controlling said gates so that each group of keys is connected in sequence for a respective predetermined period to a common key line, and a pulse generator for producing during each of said predetermined periods a series of time-displaced pulses each of which appears on a respective different output terminal of the pulse generator, wherein each output terminal is connected to one of the keys in each group so that, when any key is actuated, a control pulse, the timing of which within said series is indicative of the digit represented by that key, is applied during the respective predetermined period to the common key line, wherein said common key line controls a two-state device which is set by a control pulse on the key line and is unset at the end of each of said predetermined periods, and wherein said two-state device controls the entry of pulses into the register in dependence on the time position of each control pulse within its respective predetermined period.

It is a further object of the invention to provide a pulse generator which is suitable for use in calculating machines.

From this aspect the invention consists in a pulse generator including a plurality of first output terminals, a second output terminal, means for producing during a cycle of operation of the generator a series of time-displaced pulses each of which appears on a respective one of said first output terminals and a plurality of which appears on said second output terminal, a two-state device, and first and second gate circuits, wherein the arrangement is such that any selected one of the first output terminals can be coupled to the two-state device to control its state and that pulses appearing on the second output terminal are passed through the first gate when the two-state device is set and through the second gate when the two-state device is unset.

If a pulse generator according to the preceding paragraph is used in a calculating machine designed to perform addition and subtraction a key or keys may be provided to render the first gate operative when the machine is set to perform addition and to render the second gate operative when the machine is set to perform subtraction or vice-versa.

The invention also consists in a calculating machine for performing a plurality of arithmetical functions, including a register, a common entry line for inserting electrical pulses into said register, a plurality of gate circuits by means of which pulses are applied to the common entry line, and means for rendering the gate circuits operative selectively in dependence on the arithmetical function which the machine is set to perform.

It is a further object of the invention to provide a calculating machine which is capable of performing division.

From this aspect the invention consists in a calculating machine including a plurality of first counting devices each representing a denominational order, second and third counting devices representing respectively the two orders next above the highest order represented by the first counting devices, carry means between adjacent ones of all said counting devices, means for entering a dividend into the first counting devices, means for performing repeated subtraction of a divisor from the dividend, means for ascertaining when the second counting device registers nine and thereafter for adding the divisor back once to the dividend remainder, and means for subtracting one from the number registered by the third counting device.

The means defined in the preceding paragraph are sufficient for producing the first digit of the quotient, but in order to produce succeeding digits, it is necessary to provide means for shifting the divisor successively to the right with respect to the dividend remainder. The first digit of the quotient appears in the third counting device and, when the divisor is shifted one place to the right for the next stage of the calculation, this digit remains unaltered in the third counting device while the original second device now operates in the manner of the third counting device. The second digit of the quotient then appears in the new third counting device (originally the second counting device). Thus the second and third counting devices are gradually moved to the right through the register and each newly constituted third counting device stores one digit of the quotient. The machine is arranged to stop automatically when there is only one first counting device left in the register.

From yet another aspect the invention consists in the various features of novelty, taken either separately or in combination, of the embodiment of the invention described hereinafter, by way of example, with reference to the accompanying diagrammatic drawings, in which.

Figure 1:
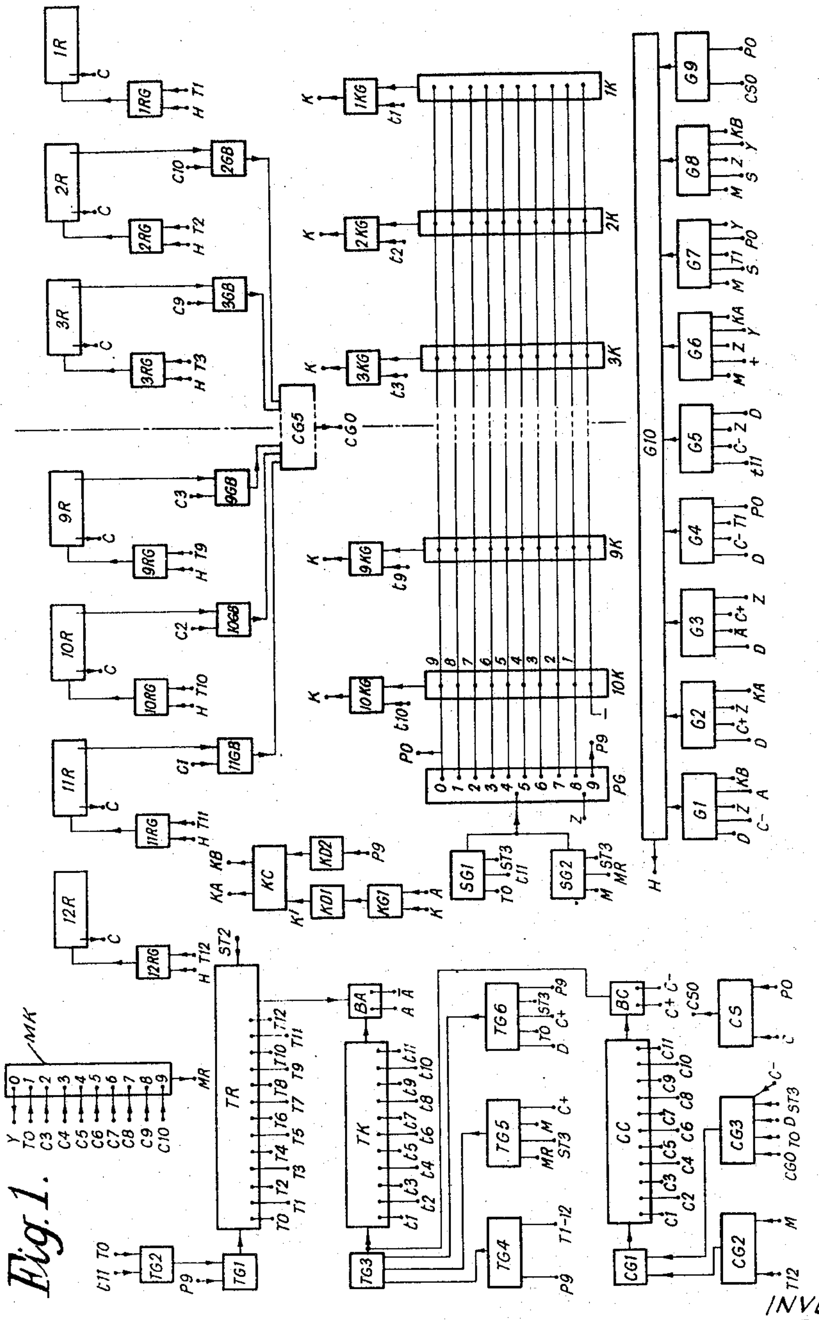
FIGURE 1 is a block diagram of a calculating machine in accordance with the invention for performing addition, subtraction, multiplication and division.

The calculating machine illustrated in FIGURE 1 includes ten groups of keys, each representing a denominational order and hereinafter referred to as an order of keys, of which only the first three orders (1K, 2K and 3K) and the last two orders (9K and 10K) are shown in the drawing. The register of the machine comprises twelve counting devices of which ten can be associated with the ten orders of keys. Of these counting devices only the first three (1R, 2R and 3R) and the last four (9R, 10R, 11R and 12R) are shown in the drawing. The two counting devices 11R and 12R are provided to receive carry pulses from the counting device 10R and these two counting devices cannot be associated with any of the orders of keys. It will be appreciated that there is no limit to the number of orders of keys and counting devices which can be employed in order to obtain any desired capacity for the machine, but it will normally be desirable to make the number of counting devices two greater than the number of orders of keys in order to accommodate carry-over from the highest order counting device which can be associated with an order of keys.

Each counting device will preferably be in the form of a ring counter of the kind disclosed in British Patent No. 925,308 published May 8, 1963, and also in U.S. application Serial No. 331,335 filed December 10, 1963 which is a continuation-in-part of U.S. Serial No. 232,663 filed October 18, 1962, now abandoned, which in turn is a continuation-in-part of U.S. Serial No. 65,414 filed October 27, 1960 and now abandoned. Each counting device has associated therewith an input gate and in the drawing there are illustrated input gates 1RG, 2RG and 3RG for the first three counting devices 1R, 2R and 3R and input gates 9RG, 10RG, 11RG and 12RG for the ninth, tenth, eleventh and twelfth counting devices 9R, 10R, 11R and 12R. The counting devices 4R to 8R (not illustrated) are respectively provided with input gates 4RG to 8RG (also not illustrated).

Each of the input gates 1RG to 12RG is in the form of an AND logical element. The input gate 1RG, for example, is shown with one input designated H and the other input designated T1. An output is applied to the counting device 1R when both the line H and the line T1 have their potentials raised. As a result, if a positive-going pulse is applied on the line H while the input T1 is energised, the counting device 1R will have its content increased by unity.

Figure 2:
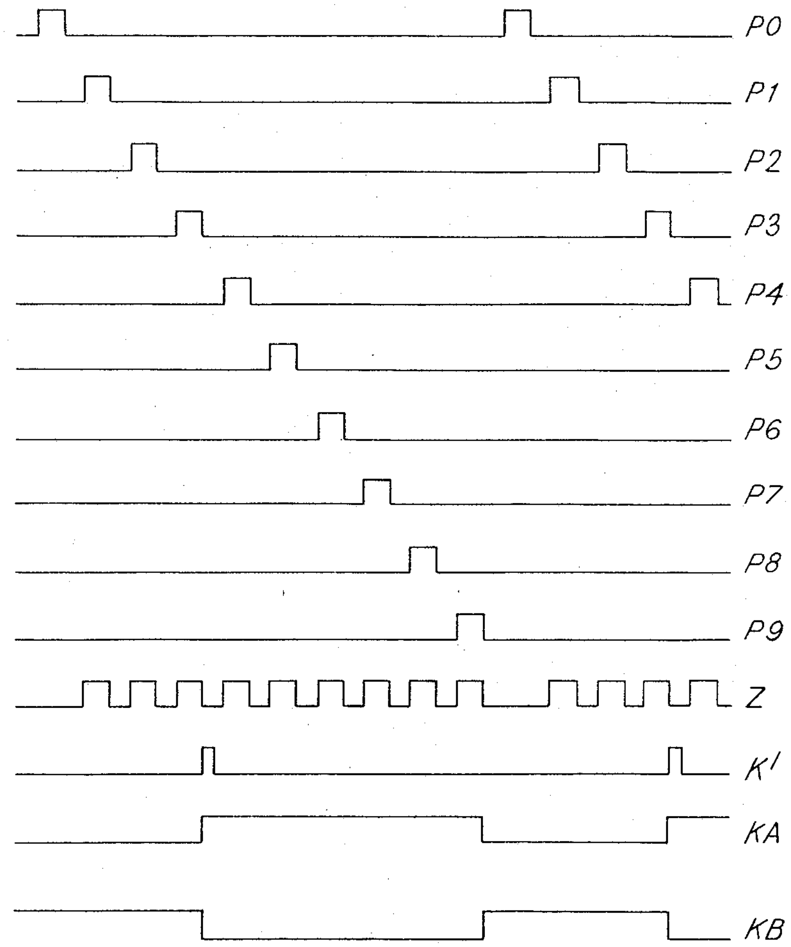
FIGURE 2 is a pulse diagram illustrating waveforms appearing at various points in the apparatus illustrated in FIGURE 1.

In addition to the input gates 1RG to 12RG associated with the counting devices 1R to 12R, further gates 1KG to 10KG are associated with the order of keys. In the drawing gates 1KG to 3KG are shown for the lowest three orders of keys 1K to 3K and gates 9KG and 10KG are shown associated with the top two orders of keys 9K and 10K. These gates are also in the form of AND logical elements and as a result an output is applied to a common line K if both the inputs of any of the gates are energised simultaneously. It will be seen that each gate has one input from the order of keys with which it is associated and also a second input designated in the case of the lowest order of keys *t*1 and in the case of the highest order of keys *t*10. The intermediate orders of keys have inputs designated *t*2 to *t*9 in accordance with the rank of the order. Each order of keys consists of nine keys numbered 1 to 9 and all the number nine keys, for example, are connected to a number nine number line, all the number eight keys are connected to a number eight number line and so on. The actuation of any key in an order serves to connect the corresponding number line to the output from that order of keys to the associated KG gate. When no key in any order is actuated the output from that order consists of a negative potential. The number lines are connected to a pulse generator PG which includes a master oscillator which determines the pulse repetition frequency and which is illustrated as having ten outputs numbered 0 to 9. Respective pulses from the generator appear on these outputs for respective periods of time during a cycle of operation of the pulse generator and the times at which the various pulses appear are illustrated in FIGURE 2 of the drawings. The pulse generator PG also has an output Z on which appear nine pulses during each cycle of operation of the pulse generator. As can be seen from FIGURE 2, these nine pulses occur at the times when the outputs P1 to P9 are energised. These times will hereinafter be referred to as P1 to P9 and similarly the time when the terminal P0 is energised will be referred to as P0.

It will be seen from FIGURE 1 of the drawings that the P0 output of the pulse generator is connected to all the number nine keys of the orders of keys 1K to 10K; that the P1 output of the pulse generator is connected to all the number eight keys; and so on up to the P8 output which is connected to the number 1 keys.

The operation of the machine is primarily controlled by two timing devices TR and TK and a control counter CC. Each of the timing devices TR and TK may consist, for example, of a ring counter and each is provided with a number of output terminals, the output terminals of the timing device TR being designated T0 to T12 and the output terminals of the timing device TK being designated *t*1 to *t*11. Each of the timing devices is stepped forward by means of input pulses and thus provides a positive potential on each output terminal in succession. Thus initially, for example, the timing device TR provides a positive output on its output terminal T0 and, when this timing device receives an input pulse, the positive potential is removed from the output terminal T0 and appears instead on the output terminal T1. Input pulses are applied to the timing device TR through an AND NOT gate TG1, one input to which is provided by the P9 output of the pulse generator PG and the other input to which is constituted by the output of an AND gate TG2. The two inputs of the AND gate TG2 are constituted by the output T0 of the timing device TR and the output *t*11 of the timing device TK. A further input to the timing device TR is constituted by an input terminal ST2 and the timing device is held on T0 until a positive potential is applied to the terminal ST2. So long as the positive potential is present on the terminal ST2, the timing device TR can be stepped from T0 to T12 by successive input pulses through the gate TG1. It will be seen that, so long as the inputs of the gate TG2 are not both positive, the timing device TR will be stepped forward once during each cycle of operation of the pulse generator by means of a pulse supplied from the P9 output of the pulse generator to the AND NOT gate TG1. Thus the timing device TR will be moved completely from T0 to T12 during thirteen cycles of operation of the pulse generator PG. The various outputs T0 to T12 of the timing device TR are connected to the inputs of the gates 1RG to 12RG and also to certain other gates as indicated by the references T0 to T12 shown at the input of these gates.

The timing device TK is similar to the timing device TR except that it has only twelve stages instead of thirteen. The timing device TK is stepped from *t*1 to *t*12 by means of input pulses received through an OR gate TG3 which has three inputs constituted respectively by the outputs of three AND gates TG4, TG5 and TG6. The AND gate TG4 has two inputs, one constituted by the P9 output of the pulse generator PG and the second constituted by the terminals T1 to T12 of the timing device TR. Thus, provided the timing device TR is not on T0, the timing device TK will be moved forward one step during each cycle of operation of the pulse generator PG. Since the timing device TK is prevented from moving while the timing device TR is on T0, it will also take thirteen cycles of operation of the pulse generator PG to move the timing device TK up to *t*12. The function of the gates TG5 and TG6 is to provide a further pulse to the timing device TK under certain conditions during the period T0. These gates will be described in more detail hereinafter.

The outputs *t*1 to *t*10 of the timing device TK are connected to the inputs of the corresponding gates 1KG to 10KG. Other connections of the various outputs of the timing device TK are as indicated by the references *t*1 to *t*11 shown at the inputs of various gates.

It will be seen that with the equipment so far described each counting device is connected to the line H in succession for the period during which the corresponding output of the timing device TR is energised, and each order of keys is connected to the line K in succession for the period during which the corresponding output of the timing device TK is energised. Thus if the timing device TR is on T1 while the timing device TK is on *t*1 the order of keys 1K will be associated with the counting device 1R. Further if the two timing devices are stepped together, the order of keys 2K will be associated with the counting device 2R and so on up to the order of keys 10K which will be associated with the counting device 10R. However, if it is arranged, for example, that the timing device TK is on *t*2 while the timing device TR is on T1, then the order of keys 2K will be associated with the counting device 1R. Under these conditions the order of keys 3K will be associated with the counting device 2R and so on up to the order of keys 10K which will be associated with the counting device 9R.

Pulses are applied to the various counting devices 1R to 12R during the corresponding T periods from a common input line H which is fed from the output of an OR gate G10. The OR gate G10 has nine inputs which are constituted by the outputs of AND gates G1 to G9. It will be seen that each of the gates G1 to G9 has an input marked P0, or an input marked Z, or an input marked KA, or an input marked KB. Those gates which have inputs marked P0 serve to supply one pulse direct to the H line when the other inputs to those gates are energized. Similarly those gates which have Z inputs serve to supply nine pulses to the H line when their other inputs are energized. The gates having KA and KB inputs serve to supply numbers of pulses to the H line which are determined by the values of any actuated keys in the orders of keys 1K to 10K. The terminals KA and KB are connected to the outputs of a bistable device KC and in the rest (or unset) state the output KB is energized. However the device KC can be changed over to the set state by means of an input through a differentiating and inverting device KD1 the input to which is constituted by the output of an AND gate KG1. One of the inputs to this AND gate is constituted by the K line and the other input is constituted by a terminal A the function of which will be described hereinafter. The device KC is returned to the rest state by means of a second input which extends from the P9 output of the pulse generator PG through a differentiating and inverting device KD2. The effect of the device KD2 is that the trailing edge of a P9 pulse is operative to return the device KC to its rest state. Similarly the effect of the differentiating and inverting device KD1 is that it is the trailing edge of any pulse applied to the K input of the AND gate KG1 that changes the device KC over from its rest state to the state in which the output KA is energised.

In order to explain the manner in which pulses are applied to the counting devices under the control of the keys in the various orders of keys 1K to 10K, it will be assumed that the number six key in the order 1K is depressed, that the timing device TR is on T1 and that the timing device TK is on *t*1. The depression of the number six key in the order of keys 1K connects the output from this order to the P3 output of the pulse generator PG. Since the terminal *t*1 is energised the P3 pulse from the pulse generator will appear on the line K. It will also be assumed that the terminal A is energised so that the P3 pulse will pass through the gate KG1 and accordingly its trailing edge will cause the bistable device KC to change over to the state in which its output KA is energised. Further it will be assumed that the terminals M, + and Y of the gate G6 are energised and accordingly, when the terminal KA is energised, this gate will open to allow the remaining pulses appearing on the Z output of the pulse generator PG to be applied through the OR gate G10 to the H line. The period during which the terminal KA is energised is illustrated in FIGURE 2 and it will be seen that during this period there are six pulses appearing on the Z output of the pulse generator. Since the terminal T1 is energised, the six pulses appearing on the H line are applied to the input of the counting device 1R through the AND gate 1RG. Thus as a result of the actuation of the number six key in the order of keys 1K, the content of the counting device 1R is increased by six.

To ensure that the number registered in any counting device is increased by one each time the counting device of the new lower order passes on to or through zero, a carry store CS is provided. This carry store is a two-state device which is set by a pulse transmitted thereto over a line C each time a counting device passes on to zero. When the carry store is set, its output CS0 is energised. The two-state device is unset by a P0 pulse applied thereto at the beginning of each cycle of the pulse generator PG. However, the arrangement is such that the output CS0 of the carry store remains energised for a short period after the arrival of the P0 pulse by which it is unset. The output CS0 is connected to one of the inputs of the AND gate G9 the other input to which is constituted by the P0 output from the pulse generator PG. Accordingly a P0 pulse will appear on the H line if the carry store has been set during the preceding cycle of operation of the pulse generator PG. Accordingly a carry pulse will be applied to any of the counting devices 2R to 12R during the period of the timing device TR when its RG gate is open if the carry store has been set during the preceding period of the timing device TR. For example a carry pulse will be applied to the counting device 2R during the period T2 if the carry store has been set during the period T1. The only counting device which can receive pulses and hence the only counting device which can pass through zero during the period T1 is the counting device 1R. Hence the counting device 2R can receive a carry pulse only from the counting device 1R and similarly each other counting device can only receive a carry pulse when the next lower counting device has passed through zero.

The components so far described are the majority of those necessary to enable the machine to perform addition and subtraction, but, when the machine is required to perform multiplication or division, it is necessary for the timing devices TR and TK to carry out a number of cycles and, to control the number of cycles of operation, a control counter CC is provided. The control counter CC has eleven outputs which are illustrated as C1 to C11. For the purposes of performing multiplication a bank of multiplier keys MK is provided and each of the multiplier keys 1 to 9 is associated with a respective one of the outputs C2 to C10 of the control counter CC. Each multiplier key when operated connects the corresponding output of the control counter CC to the multiplier key bank output terminal MR. When none of the multiplier keys 2 to 9 are operated, the output T0 of the register timer TR is connected to the terminal MR. Normally the output Y shown connected to the 0 multiplier key is at a positive potential, but, when the 0 multiplier key is operated, the potential of the terminal Y is made negative.

Normally, when the machine is switched on, the pulse generator PG is running continuously. However the pulse generator can be stopped when a control signal is applied thereto from the output of a stop gate SG1 or of a stop gate SG2. Each of these gates is in the form of an AND logical element and it will be seen that the inputs to the stop gate SG1 are constituted by the terminals T0, *t*11 and a terminal ST3 which will be described hereinafter. The inputs to the stop gate SG2 are constituted by a terminal M, the terminal MR and the terminal ST3. Thus assuming that the terminals M and ST3 are energised the pulse generator will be stopped when a positive potential is applied to the terminal MR. As previously pointed out the terminal MR is connected to a selected one of the outputs of the control counter CC by the operation of a muliplier key. Accordingly the pulse generator is stopped when the timing device TR has performed a number of cycles corresponding to the operated key in the bank of multiplier keys.

The control counter CC may be a ring counter similar to the devices TR and TK. It is stepped forward by means of input pulses received through an OR gate CG1. The two inputs of the OR gate CG1 are constituted by the outputs of two AND gates CG2 and CG3. It will be seen that the inputs of the AND gate CG2 are constituted by the terminals T12 and M and that the inputs of the AND gate CG3 and constituted by the terminals CG0, T0, D and ST3. During multiplication the terminal M is energised and accordingly the control counter CC will be stepped forward once each time the timing device TR passes through T12.

It has already been pointed out that any order of keys can be associated with any one of the counting devices since the timing devices TR and TK need not move in step. However inaccuracies would be introduced into any calculation in which an order of keys was associated with a counting device of higher order than that order of keys. Accordingly to prevent such association a bistable device BA is provided. This bistable device has two outputs A and $\overline{A}$. Normally the output A is positive and the other output is negative. However the bistable device may be set by means of an output from the timing device TK which is arranged to occur at the end of the period *t*11. When the device is set, the output $\bar{A}$ is energised and the output A becomes negative. The device is reset by means of an input from the timing device TR which is arranged to occur at the end of the period T0. It will be seen that the terminal A constitutes one of the inputs of the gate KG1 so that no key can affect the output of the two-state device KC after the end of the period *t*11. Accordingly no pulses can be entered from the keys under normal conditions after the period *t*11.

When the machine is used for division, a further bistable device BC is required. This device is operative, when the machine is being used for division, to determine whether the divisor is added to or subtracted from the dividend and it is provided with two outputs one of which is designated C+ and the other C−. In the unset state the output C− is positive, and in the set state the output C+ is positive. The device is set each time the control counter CC is stepped and is unset by the back edge of the next T0 pulse from the output of the gate TG3.

The machine being described is suitable for performing addition, subtraction, multiplication and division. The various functions which can be performed are selected by means of changeover switches. These switches are not shown in the drawing, but they operate to apply positive potentials to the terminals indicated in the following Table 1:

TABLE 1

| | | |
|---|---|---|
| Addition | M | + |
| Subtraction | M | S |
| Multiplication | M | + |
| Division | D | + |

*Operation*

When the machine in in the waiting condition, the pulse generator PG is running and produces its normal ten pulses during each cycle of operation. However, these pulses are ineffective at this time because the timing device TR is maintained at T0 and accordingly none of the gate circuits 1RG to 12RG is open. The timing device TR is maintained on T0 by a negative potential applied to it through a start contact ST2. Negative potentials are also supplied by a start contact ST1 which serves to maintain the control counter CC on C1 and a third start contact ST3 which serves to close the gates SG1, SG2, CG3, TG5 and TG6.

*Addition*

When the machine is set to perform addition, positive potentials are applied to the terminals M and +, and the start contacts ST1, ST2 and ST3 are under the control of the keys in the various orders of keys 1K to 10K. Further, since none of the multiplier keys MK is depressed, a positive potential will appear on the terminal Y.

It will be assumed that the number 34 is to be added to the number 57. Before the start of the calculation the counting device will register zero. To insert 34 into the regitser the number 3 key is depressed in the order 2K and the number 4 key is depressed in the order 1K. It is assumed in the following description that the two keys have been depressed simultaneously and that the 3 and the 4 are both added into the register during the same cycle of operation of the timing devices TR and TK. However, this is not the normal method of operating the machine since the operator will normally depress one key and then the other. In this case the insertion of each digit into the register will occupy a separate cycle of operation of the timing devices TR and TK. It is irrelevant whether the higher order or the lower order key is depressed first.

When the keys are depressed, the negative potentials are removed from the various start contacts. As a result the next P9 pulse produced by the pulse generator PG will step the timing device TR from T0 to T1. Since the number four key is depressed in the order 1K and since the timing device TK is on *t*1, the next P5 pulse generator PG will pass through the gate 1KG to the line K. Accordingly since the two-state device BA is in the unset condition with its output A energised, the trailing edge of the P5 pulse will be operative to change the two-state device KC over to its set state in which its output KA is energized. Accordingly, since the inputs M, +, Y and KA of the gate G6 are all energised, the remaining four pulses appearing at the Z output of the pulse generator PG during this cycle of operation of the pulse generator will be passed through the gates G6 and G10 to the line H. Since the terminal T1 of the gate 1RG is energized, these four pulses will be passed through the gate 1RG and will step the counting device 1R from 0 to 4. The trailing edge of the P9 pulse will cause the two-state device KC to be returned to its unset state in which its output KB is energised. The same P9 pulse will also be operative to step the timing device TR from T1 to T2 and the timing device TK from *t*1 to *t*2. Accordingly during the next cycle of operation of the pulse generator PG the gates 2KG and 2RG will be open. Since the number three key is depressed in the order of keys 2K, the P6 pulse will pass through the gate 2KG and its trailing edge will change the two-state device KC over to its set state in which the output KA is energised. Accordingly, the P7, P8 and P9 pulses of the cycle will be applied through the Z line, the gate G6, the gate G10, the H line and the gate 2RG, to the input of the counting device 2R to step it from 0 to 3. The trailing edge of the P9 pulse will change the two-state device KC back to its unset state and will also step the timing device TR to T3 and the timing device TK to *t*3. Since no key is depressed in the order of keys 3K the two-state device KC will remain in its unset state during the next cycle of operation of the pulse generator and accordingly the gate G6 will remain closed. The pulse P9 during this cycle will step the timing device TR to T4 and the timing device TK to *t*4 and these processes will continue until the timing device TR has reached T0 and the timing device TK has reached *t*1. As has already been pointed out, when no multiplier key is depressed, the terminal T0 is connected to the terminal MR so that the energisation of T0 causes the gate SG2 to apply a potential to the pulse generator PG which is effective to stop the generator.

When the keys in the orders 1K and 2K are released the negative potential is restored to the start contact ST3 so that the gate SG2 is closed and the pulse generator PG recommences its operation.

To perform the second stage of the calculation, the number five key in the order 2K is depressed and the number seven key in the order 1K is depressed. This causes the negative potentials to be removed from the various start contacts and the timing device TR is allowed to step from T0 to T1 when it receives the next P9 pulse from the pulse generator PG. Since the number seven key in the order 1K is depressed and since the timing device TK is on *t*1, the next P2 pulse from the pulse generator PG will pass through the gate 1KG to the line K. The trailing edge of the P2 pulse will change the two-state device KC over to its set state and the remaining seven pulses appearing at the Z output of the pulse generator PG during this cycle of operation of the pulse generator will be passed through the gates G6 and G10 to the line H. Since the terminal T1 of the gate 1RG is energised, these seven pulses will be passed through the gate 1RG and will step the counting device 1R from 4 to 9 and thence to 0 to 1. When the counting device 1R registers 0, a pulse is applied to the input of the carry store CS over the common carry line C. This pulse sets the carry store so that a positive potential appears on the terminal CS0. The P9 pulse at the end of this cycle of operation of the pulse generator PG will return the two-state device KC to its unset state and will also step the timing device TR from T1 to T2 and the timing device TK from *t*1 to *t*2. The P0 pulse at the beginning of the next cycle of operation of the pulse generator PG passes through the gate G9 to the H line and since the terminal T2 is energised the pulse passes through the gate 2RG and steps the counting device 2R from 3 to 4. The P0 pulse also returns the carry store CS to its unset state. Since the number five key in the order of keys 2K is depressed, the P4 pulse during this cycle will pass through the gate 2KG to set the two-state device KC. Accordingly five pulses will be applied to the input of the counting device 2R to step it from 4 to 9. Since no keys are depressed in the orders of 3K to 10K, the two-state device KC will remain in its unset state during the next eight cycles of operation of the pulse generator PG and the gate G6 will remain closed. At the end of the period T12, the pulse generator PG will be stopped and, when the keys 5 and 7 in the orders 2K and 1K are released, the pulse generator will restart. The register of the machine now reads 000000000091, which is the result of the addition of 34 to 57.

*Subtraction*

When the machine is set to perform subtraction a positive potential is applied to the terminal S instead of to the terminal +, but otherwise conditions are as for addition. Accordingly the gate G6 will be rendered inoperative, but the gates G7 and G8 will be opened when their remaining inputs are energised.

As an example the subtraction of 17 from 34 will be described.

Initially the number 34 is entered into the register with the machine set for addition in the same manner as in the example described above. The machine is then changed over to subtraction and the number 17 is inserted in the orders 2K and 1K. Once again it will be assumed that the two keys are depressed together, but it is to be understood that normally the operator will first depress the number one key in the order 2K and then the number seven key in the order 1K.

When the keys have depressed, the negative potentials are removed from the various start contacts and as a result the next P9 pulse generated by the pulse generator PG will step the timing device TR from T0 to T1. Accordingly the next P0 pulse from the pulse generator PG will be applied through the gate G7 to the counting device 1R and will step it from 4 to 5. Further since the bistable device KC is unset, the pulses P1 and P2 will pass through the gate G8 via line Z and likewise will be applied to the counting device 1R to step it from 5 to 7. Since the number seven key in the order 1K is depressed, the trailing edge of the P2 pulse will change the two-state device KC over to its set state and will thus remove the positive potential from the terminal KB and close the gate G8. Accordingly no further pulses during this cycle of operation of the pulse generator will be passed through the gate G8 to the counting device 1R. The P9 pulse will cause the two-state device KC to be returned to its unset state in which its output KB is energised and will also step the timing device TR from T1 to T2 and the timing device TK from *t*1 to *t*2.

Since the output KB of the two-state device KC is energised, pulses P1 to P8 produced during the next cycle of operation of the pulse generator PG will be passed through the gate G8 to the H line. Since the timing device TR is on T2 these pulses will be applied to the counting device 2R to step it from 3 to 0 and thence to 1. Since the number 1 key in the order 2K is depressed, the trailing edge of the P8 pulse will change the two-state device KC over to its set state and will thus remove the positive potential from the terminal KB and close the gate G8. Accordingly the P9 pulse will not be passed through the gate G8.

When the counting device 2R registers 0, a pulse is applied to the input of the carry store CS over the common carry line C. This pulse sets the carry store so that a positive potential appears on the terminal CS0. Accordingly the P0 pulse at the beginning of the next cycle passes through the gate G9 to the H line and, since the terminal T3 is energised, the pulse passes through the gate 3RG and steps the counting device 3R from 0 to 1. Further, since the terminal KB remains energised throughout this cycle, as no key has been depressed in the order of keys 3K, the pulses P1 to P9 will also be applied to the counting device 3R to step it from 1 to 0. The arrival of the counting device 3R at 0 will set the carry store CS and accordingly during the next cycle of operation the pulses P0 to P9 will be applied to the counting device 4R to step it from 0 to 0. Similar considerations apply to the devices 5R to 12R which will be stepped from 0 to 0 during the periods T5 to T12. At the end of the period T12 the control counter CC will be stepped from C1 to C2 as a result of the input through the gate CG2 and, since no multiplier key is depressed the input MR of the gate SG2 will be energised and the pulse generator PG will be stopped. When the keys 1 and 7 in the order 2K and 1K are released, the pulse generator will restart. At the end of the calculation the register will read 000000000017 which is the result of subtracting 17 from 34.

*Multiplication*

When the machine is to be used for multiplication, the conditions are the same as for addition except that the start contacts ST1, ST2 and ST3 are under the control of the multiplier keys MK instead of the keys in the various orders of keys 1K to 10K. Further the machine is converted from a key-responsive machine to a key-set machine. In other words, when a key in any of the orders of keys 1K to 10K is depressed, it will remain actuated until the calculation is complete.

As an example the multiplication of 34 by 17 will be described.

Initially the multiplicand 34 is set on the keys of the machine by the depression of the number three key in the order 10K and the number four key in the order 9K. The orders 10K and 9K are only given by way of example since the multiplicand can be set on any two consecutive orders of keys on the left-hand side of the machine. However, it will normally be set in the highest possible orders since, if either the multiplicand or the multiplier is long and the multiplicand is set too far to the right, one or more digits on the right-hand side of the product will be lost unnecessarily.

The two depressed keys will lock down as the machine is set for multiplication, but the machine will not start to operate since these keys no longer control the start contacts.

The first digit of the multiplier 17 is now entered into the multiplier keys by the depression of key 1 in the bank MK. This key locks down and the negative potential will be removed from the start contacts.

As a result the next P9 pulse produced by the pulse generator PG will step the timing device TR from T0 to T1. Since no keys are depressed in the orders 1K to 8K, no pulses will be applied to the K line during the next eight cycles of operation of the pulse generator PG. However, since the number four key in the order 9K has been depressed, during the period T9 the P5 pulse from the pulse generator PG will pass through the gate 9KG to the line K when the timing device TK is at *t*9.

The trailing edge of the P5 pulse will set the two-state device KC and accordingly the remaining four pulses appearing at the Z output of the pulse generator PG during this cycle of operation will be passed through the gates G6 and G10 to the line H. Since during this cycle of operation the timing device TR is on T9, these pulses will pass through the gate 9RG to step the counting device 9R from 0 to 4. Similarly during the next cycle of operation of the pulse generator PG the counting device 10R will be stepped from 0 to 3.

No pulses are entered into the register while the timing device TR is on T11, but during T12 the bistable device BA is changed over so that its output $\overline{A}$ is energised. At the end of the period T12 the control counter CC is stepped from C1 to C2. Since the number one multiplier key is depressed, the output C2 of the control counter CC is connected to terminal MR. Accordingly, all three inputs of the stop gate SG2 are energised, and the pulse generator PG is stopped.

When the pulse generator stops, the depressed key 1 in the bank MK is automatically released and the negative potential reappears on the start contacts, so that the control counter CC is returned to C1 and the pulse generator is restarted. The terminal MR is also connected to one of the inputs of the gate TG5 and as a result the energisation of this terminal causes the timing device TK to be stepped from *t*1 to *t*2. The first stage of the calculation is now complete and the register reads 003400000000.

Key number 7 in the bank of multiplier keys MK is now depressed and the next P9 pulse will step the timing device TR from T0 to T1. The following P9 pulses will step the timing devices TR and TK together with the result that the timing device TK will be on *t*3 while the timing device TR is on T2 and so on until the timing device TK is on *t*9 while the timing device TR is on T8. During this period the P5 pulse from the pulse generator PG will pass through the gate 9KG to the line K and will set the two-state device KC. As a result four pulses will pass through the gate 8RG to the counting device 8R which will therefore be stepped from 0 to 4.

When the timing device TK is on *t*10, the timing device TR will be on T9 and accordingly three pulses will be passed through the gate 9RG to step the counting device 9R from 4 to 7. When the counting device TK reaches *t*12, the bistable device BA will be set and, when the timing device TR reaches T12, the control counter CC will be stepped from C1 to C2.

As the number seven key in the bank of multiplier keys MK is depressed, the output C2 of the control counter CC is not connected to the terminal MR and accordingly no stop pulse is applied through the gate SG2 at this stage.

The timing devices TR and TK therefore continue to be stepped together until the timing device TK is on *t*9 and and the timing device TR is on T8. Four pulses are then added into the counting device 8R to step it from 4 to 8. Further while the timing device TK is on *t*10 and the timing device TR is on T9, three pulses are added into the counting device 9R to step it from 7 to 0. As a result of the arrival of the counting device 9R at 0 the carry store CS is set and, while the timing device TR is at T10, the P0 pulse is applied through the gate G9 to the counting device 10R which is accordingly stepped from 3 to 4. When the timing device TR reaches T12, the control counter CC is stepped from C2 to C3.

The machine continues to perform repeated addition while the control counter CC is stepped up to C8. When the control counter reaches C8, the terminal MR is energised and accordingly a positive potential is applied through the gate SG2 to stop the pulse generator.

The multiplier number seven key is automatically released allowing the pulse generator PG to restart. In addition the timing device TK is stepped from *t*2 to *t*3 so that the machine is ready to perform another stage of multiplication. The machine now registers 005780000000.

The various stages of the calculation are summarised in the following Table 2.

TABLE 2

| 12 | 11 | 10 | 9 | 8 | 7 | BA | CC | T | t | |
|---|---|---|---|---|---|---|---|---|---|---|
| | | | | | | | | | | 34 is entered on keys 10K |
| | | | | | | | | | | and 9K but does not appear |
| 0 | 0 | 0 | 0 | 0 | 0 | A | 1 | 0 | 1 | in register. |
| | | | | | | | | | 1 | Multiplier key 1 is |
| | | | | | | | | | | depressed and machine |
| | | | | | | | | 1 | | starts. 34 is added in |
| | | | | | | | | | | counting devices 10R |
| 0 | 0 | 3 | 4 | 0 | 0 | A | 1 | 11 | 11 | and 9R. |
| | | | | | | | | | | At the beginning of T12 BA |
| | | | | | | | | | | is changed over to $\bar{A}$ and at |
| | | | | | | | | | | the end of T12 CC is |
| 0 | 0 | 3 | 4 | 0 | 0 | $\bar{A}$ | 2 | 12 | 12 | stepped to 2. |
| | | | | | | | 2 | 0 | 1 | MR is energized so that the |
| | | | | | | | | | | machine stops and TK is |
| | | | | | | | | | | stepped from t1 to t2. CC |
| 0 | 0 | 3 | 4 | 0 | 0 | A | 1 | 0 | 2 | returns to 1. |
| | | | | | | | | | 2 | Multiplier key 7 is |
| | | | | | | | | | | depressed and machine |
| | | | | | | | | 1 | | starts. 34 is added in |
| 0 | 0 | 3 | 7 | 4 | 0 | A | 1 | 10 | 11 | counting devices 9R and 8R. |
| 0 | 0 | 3 | 7 | 4 | 0 | $\bar{A}$ | 1 | 11 | 12 | BA is changed over to $\bar{A}$. |
| 0 | 0 | 3 | 7 | 4 | 0 | $\bar{A}$ | 2 | 12 | 1 | CC is stepped to 2. |
| | | | | | | | | 0 | 2 | As MR is not energised, 34 |
| 0 | 0 | 4 | 0 | 8 | 0 | | 3 | 12 | 1 | is added again in 9R and 8R. |
| 0 | 0 | 4 | 4 | 2 | 0 | | 4 | | | 34 is added again. |
| 0 | 0 | 4 | 7 | 6 | 0 | | 5 | | | 34 is added again. |
| 0 | 0 | 5 | 1 | 0 | 0 | | 6 | | | 34 is added again. |
| 0 | 0 | 5 | 4 | 4 | 0 | | 7 | | | 34 is added again. |
| 0 | 0 | 5 | 7 | 8 | 0 | A | 7 | 10 | 11 | 34 is added again. |
| 0 | 0 | 5 | 7 | 8 | 0 | $\bar{A}$ | 7 | 11 | 12 | BA is changed to $\bar{A}$. |
| 0 | 0 | 5 | 7 | 8 | 0 | $\bar{A}$ | 8 | 12 | 1 | CC is stepped to 8. |
| | | | | | | | 8 | | 2 | MR is energised so that |
| | | | | | | | | | | machine stops and TK is |
| 0 | 0 | 5 | 7 | 8 | 0 | A | 1 | 0 | 3 | stepped from t2 to t3. |

If there is a number in the register before the start of a multiplication, the product will normally be added to the number in the register. However, if desired the product can be subtracted from the number in the register. To obtain this result, the machine is set for multiplication and subtraction so that positive potentials are applied to the terminals M and S instead of to the terminals M and +. As a result the gate G6 is closed and the gates G7 and G8 are opened. The sequence of events is then the same as in the multiplications operations described above except that repeated subtractions are performed instead of repeated additions.

If a digit of the multiplier is 0, a negative potential appears on the terminal Y when the 0 multiplier key is depressed and accordingly the gates G6, G7 and G8 are closed. Consequently, no additions or subtractions can be made in any of the counting devices 1R to 12R, but the gate TG5 will open when the timing device TR reaches T0 so that the timing device TK will be moved forward one step. Accordingly, there will be no effect on the number in the register, but, if the 0 digit is followed by a further digit of the multiplier, the stepping of the timing device TK will be equivalent to multiplying the number in the register by 10.

To illustrate the manner in which the digits of the multiplicand are dropped when it is beyond the capacity of the machine to deal with them, the various steps in the multiplication of 1234567890 by 1111111111 are given in Table 3. It will be seen that ten digits of the multiplier can be entered. However at this stage the timing device TK is on *t*11 when the timing device TR is on T0 and accordingly the gate TG2 is open. Since the gate TG1 functions as an AND NOT logical element, P9 pulses can no longer step the timing device TR. The pulse generator PG will be running after the tenth stage of the multiplication has been completed and the depressed multiplier key has been released. However, if any further multiplier key is depressed the negative potential will be removed from the start contact ST3 and the gate SG1 will open. The output from this gate will stop the pulse generator and the depressed multiplier key will automatically be released without any change being made in the number in the register.

TABLE 3

| 12 | 11 | 10 | 9 | 8 | 7 | 6 | 5 | 4 | 3 | 2 | 1 | T | t | |
|---|---|---|---|---|---|---|---|---|---|---|---|---|---|---|
| | 0 | 1 | 2 | 3 | 4 | 5 | 6 | 7 | 8 | 9 | 0 | 0–10 | 1–10 | 1234567890 is added into 10R to 1R. |
| 0 | 0 | 1 | 3 | 5 | 8 | 0 | 2 | 4 | 6 | 7 | 9 | 0–9 | 2–10 | 123456789 is added into 9R to 1R. |
| 0 | 0 | 1 | 3 | 7 | 0 | 3 | 7 | 0 | 3 | 5 | 7 | 0–8 | 3–10 | 12345678 is added into 8R to 1R. |
| 0 | 0 | 1 | 3 | 7 | 1 | 6 | 0 | 4 | 9 | 2 | 4 | 0–7 | 4–10 | 1234567 is added into 7R to 1R. |
| 0 | 0 | 1 | 3 | 7 | 1 | 7 | 2 | 8 | 3 | 8 | 0 | 0–6 | 5–10 | 123456 is added into 6R to 1R. |
| 0 | 0 | 1 | 3 | 7 | 1 | 7 | 4 | 0 | 7 | 2 | 8 | 0–5 | 6–10 | 12345 is added into 5R to 1R. |
| 0 | 0 | 1 | 3 | 7 | 1 | 7 | 4 | 1 | 9 | 5 | 9 | 0–4 | 7–10 | 1234 is added into 4R to 1R. |
| 0 | 0 | 1 | 3 | 7 | 1 | 7 | 4 | 2 | 0 | 8 | 2 | 0–3 | 8–10 | 123 is added into 3R to 1R. |
| 0 | 0 | 1 | 3 | 7 | 1 | 7 | 4 | 2 | 0 | 9 | 4 | 0–2 | 9–10 | 12 is added into 2R and 1R. |
| 0 | 0 | 1 | 3 | 7 | 1 | 7 | 4 | 2 | 0 | 9 | 5 | 0–1 | 10 | 1 is added into 1R. |
| 0 | 0 | 1 | 3 | 7 | 1 | 7 | 4 | 2 | 0 | 9 | 5 | 0 | 11 | Machine prevented from starting. |

*Division*

When the machine is to be used for division, the dividend is entered into the register and the divisor is entered on the keys. Division is performed by subtracting the divisor from the dividend until the dividend remainder goes negative, whereupon the divisor is added back once and is then in effect shifted one place to the right. This process takes place ten times, after which the machine stops. The quotient is accumulated on the left-hand side of the register and, as the division proceeds, the least significant digits of the divisor are dropped off one by one in the same way as the digits of the multiplicand are dropped off in multiplication.

When the machine is to be used for division, the terminals D and + are energised and the terminals M and S are deenergised. The start contacts are under the control of the multiplier keys and the keys in the orders of keys 1K to 10K are latched as in multiplication.

As an example, the division of 146 by 12 will be described.

Initially, the machine is set for addition and the number 146 is entered into the counting devices 10R, 9R and 8R by the depression of the key 1 in the order 10K, the key 4 in the order 9K and the key 6 in the order 8K. The machine is now set for division and the divisor 12 is entered into the keys of the orders of keys 10K and 9K.

The 0 key in the bank MK is now depressed to remove the negative potentials from the various start contacts. The next P9 pulse from the pulse generator PG steps the timing device TR from T0 to T1 and the following P0 pulse will be applied through the gate G4 to the counting device 1R and will step it from 0 to 1. The P0 pulse is able to pass through the gate G4 because the machine is set for division, because the bistable device BC is in the unset state in which its output C— is energised and because the timing device TR is on T1. Moreover, since the bistable device KC is unset and since no key is depressed in the order of keys 1K, the pulses P1 to P9 will pass through the gate G1 to the counting device 1R to step it from 1 to 0.

When the counting device 1R registers 0, the carry store CS is set and accordingly the P0 pulse at the beginning of the next cycle passes through the gate G9 to step the counting device 2R from 0 to 1. The remaining nine pulses during this cycle step the counting device 2R from 1 to 0 and this process continues during the periods T3 to T7 so that the counting devices 3R to 7R are all stepped from 0 to 0. A further similar process occurs during the period T8 when the counting device 8R is stepped from 6 to 6.

During the period T9 the P0 pulse is entered into the counting device 9R through the gate G9 and the pulses P1 to P7 are applied to the counting device 9R through the gate G1. However, since the number two key in the order 9K is depressed, the bistable device KC will be set at the end of the P7 pulse and accordingly the terminal KB will be deenergised and the gate G1 closed. Thus a total of eight pulses are entered into the counting device 9R to step it from 4 to 2. As the counting device 9R passes through 0, it will set the carry store CS and accordingly the P0 pulse at the beginning of the period T10 will step the counting device 10R from 1 to 2. Further, since the number one key in the order 10K is depressed, the pulses P1 to P8 will be applied to the counting device 10R to step it from 2 to 0. As the counting device 10R passes through 0, it sets the carry store CS so that during the period T11 one pulse is applied to the counting device 11R through the gate G9 and nine further pulses are applied to this counting device through the gate G1. Accordingly, the counting device 11R steps from 0 to 0 and sets the carry store CS. The P0 pulse at the beginning of the period T12 is applied to the counting device 12R through the gate G9, but at the end of the period T11 the bistable device BA is set so that its output A is deenergised. Accordingly, the gate G1 is closed and the pulses P1 to P9 cannot reach the counting device 12R. Thus the register now reads 100260000000.

The next P9 pulse from the pulse generator steps the counting device TR from T12 to T0 and the counting device TK from *t*12 to *t*1. At the end of the period T0 the bi-stable device BA is unset so that its output A is again energised. The next P9 pulse steps the counting device TR to T1, but, since the gate TG4 is closed while the counting device TR is on T0, the counting device TK remains on $t1$. Thus during the following nine cycles of operation the timing devices TK and TR remain in step and accordingly the machine performs a further subtraction operation similar to that just described. Further, when the pulses P0 to P8 are entered into the counting device 10R during the period T10 this counting device is left registering 9. Accordingly, the carry store CS is not set and the next P0 pulse is not applied to the counting device 11R which accordingly is also stepped to 9. Once again the carry store CS is not set and thus no entry is made in the counting device 12R. The register now reads 199060000000.

Since the control counter CC is on C1 and since the counting device 11R is on 9, both inputs of the gate 11GB are energised and a positive potential is applied to the terminal CG0. Thus during the following period T0 all the inputs of the gate CG3 are energised and the control counter CC is stepped from C1 to C2. The stepping of the control counter sets the bistable device BC so that the output C+ is energised in place of the output C−. As a result the gates G1, G4 and G5 are disabled and the gates G2 and G3 are prepared. The timing devices TR and TK are driven on in step and no entries are made in the counting devices 1R to 8R during the periods T1 to T8 since the gate G2 is closed by the negative potential on the terminal KA and the gate G3 is closed by the negative potential on the terminal $\overline{A}$. However, during the period T9, since the number two key is depressed in the order 9K, the trailing edge of the P7 pulse sets the bistable device KC. Thus the terminal KA is energised and the pulses P8 and P9 pass through the gate G2 to step the counting device 9R from 0 to 2. Similarly during the period T10 one pulse will be applied to the counting device 10R to step it from 9 to 0. Accordingly, the carry store CS will be set and the next P0 pulse will step the counting device 11R from 9 to 0 so that the carry store will again be set. Thus during the period T12 the P0 pulse will step the counting device 12R from 1 to 2. However, at the end of the period T11 the bistable device BA was set so that its output $\overline{A}$ is energised. Accordingly the gate G3 is opened and the pulses P1 to P9 are applied to the counting device 12R to step it from 2 to 1. Thus the register now reads 100260000000.

The timing device TR is now stepped to T0 and the timing device TK is stepped to $t1$ and, as the two-state device BC is still on C+, the next P9 pulse passes through the gate TG6 and steps the timing device TK from $t1$ to $t2$. Further at the end of the period T0 the bistable device BC is unset so that its output C− is energised instead of its output C+. Also at the end of the period T0 the bistable device BA is unset so that its output A is energised.

The machine now performs a further subtraction, but this time the order of keys 2K is associated with the counting device 1R, the order of keys 3K is associated with the counting device 2R, and so on. Ten pulses are entered into each of the counting devices 1R to 7R during the periods T1 to T7 ($t2$ to $t8$). During the period T8 the timing device TK is on $t9$ and accordingly eight (1+7) pulses are applied to the counting device 8R to step it from 6 to 4. Similarly during the period T9 ($t10$) nine (1+8) pulses are added into the counting device 9R to step it from 2 to 1. Ten pulses are applied to the counting device 10R during the period T10 ($t11$), but during the period T11 ($t12$) the bistable device BA is set so that the gate G1 is closed and only one pulse (the carry pulse P0) is applied to the counting device 11R. The bistable device BA remains set during the period T12 and accordingly no pulses are applied to the counting device 12R. The register now reads 110140000000.

The machine performs two more subtractions similar to that just described and at the end of the second period T10 ($t11$) the register reads 129900000000. Since the control counter CC is on C2 and since the counting device 10R registers 9, the terminal CG0 is energised and during the next T0 period the control counter CC is stepped from C2 to C3. This stepping sets the bistable device BC and accordingly 12 is added back into the counting devices 9R and 8R in the manner explained above for the counting devices 10R and 9R. During the period T11, the timer TK is on $t12$ and accordingly the bistable device BA is set. Thus the gate G3 is open and nine pulses are added into the counting device 11R, which is stepped from 3 to 2. In the process it passes through 0 and accordingly a carry pulse is applied to the counting device 12R to step it from 1 to 2 at the beginning of the period T12. As the bistable device BA is still set, nine further pulses are added into this counting device to step it from 2 to 1. When the timing device TR steps to T12, the timing device TK steps to $t1$. The register now reads 120020000000.

The next P9 pulse steps the timing device TR to T0 and the timing device TK to $t2$. The P9 pulse is able to step the timing device TK because the gate TG6 is open. At the end of the period T0 the bistable device BC is unset so that its output C− is energised and the bistable device BA is unset so that its output A is energised.

The machine now performs a further series of subtractions but this time the order of keys 3K is associated with the counting device 1R, the order of keys 4K is associated with the counting device 2R, and so on. As a result of the first subtraction, the resister reads

121008000000 and at the end of the second subtraction reads

121996000000

As the control counter is now on C3 and as the counting device 9R registers 9 the terminal CG0 is energized and the control counter CC is stepped from C3 to C4. As a result the bistable device BC is set and 12 is added back into the counting devices 8R and 7R. Further, nine pulses are added into each of the counting devices, 12R, 11R and 10R so that the register now reads

121008000000

The machine continues to perform a series of operations each consisting of repeated subtractions until the dividend remainder becomes negative followed by on addition. During the first of these operations the order of keys 4K is associated with the counting device 1R, the order of keys 5K is associated with the counting device 2R, and so on. These operations continue until the order of keys 10K is associated with the counting device 1R. As a result of the preceding stages of the calculation the register will read 121666666901 and the control counter CC will be on C10. The first digit of the divisor (1) is now subtracted from the figure standing in the counting device 1R. The second subtraction causes the number in the register to go negative and the 1 is added back into the counting device 1R. In addition, nines are added into the counting devices 12R to 3R with the result that the register reads 121666666800. When the timing device TR is stepped to T0, the timing device TK is stepped to $t10$ and the gate G5 is opened to allow nine pulses to be applied to each of the counting devices 1R to 12R. Further, an odd 1 is added to the counting device 1R through the gate G4. This flooding of the machine with nines prevents a further subtraction being performed since this last subtraction would produce an incorrect answer. The timing device TR is now stepped to T0 and the timing device TK to $t11$. Accordingly, the stop gate SG1 is energised and the pulse generator is stopped. When the pulse generator stops, the 0 multiplier key, which was depressed and latched down at the beginning of the calculation, is automatically released.

The various steps of the calculation just described are shown in the following Table 4:

TABLE 4

| BC | CC | 12 | 11 | 10 | 9 | 8 | 7 | 6 | 5 | 4 | 3 | 2 | 1 | T | t | |
|---|---|---|---|---|---|---|---|---|---|---|---|---|---|---|---|---|
| | | | | | | | | | | | | | | 0 | 1 | 146 is entered in the register in orders 10R, 9R and 8R. |
| − | 1 | 0 | 0 | 1 | 4 | 6 | 0 | 0 | 0 | 0 | 0 | 0 | 0 | 12 | 12 | Press DIVIDE function key. Enter 12 in keys 10K and 9K and press 0 multiplier key. |
| | | | | | | | | | | | | | | 0 | 1 | |
| | | | | | | | | | | | | | | 1 | 1 | 12 is subtracted from 14 in 10R and 9R. 11R does not register 9 and therefore BC and CC do not move. |
| − | 1 | 1 | 0 | 0 | 2 | 6 | 0 | 0 | 0 | 0 | 0 | 0 | 0 | 11 | 11 | |
| | | | | | | | | | | | | | | 1 | 1 | 12 is subtracted from 02 in 10R and 9R. |
| − | 1 | 1 | 9 | 9 | 0 | 6 | 0 | 0 | 0 | 0 | 0 | 0 | 0 | 11 | 11 | 11R registers 9 and therefore CC is stepped to 2 and BC, is changed over to C+. |
| + | 2 | 2 | 1 | 9 | 9 | 0 | 6 | 0 | 0 | 0 | 0 | 0 | 0 | 0 | 1 | |
| | | | | | | | | | | | | | | 1 | 1 | 12 is added to 90 in 10R and 9R. |
| + | 2 | 2 | 0 | 0 | 2 | 6 | 0 | 0 | 0 | 0 | 0 | 0 | 0 | 11 | 11 | 9 is added into 12R. |
| + | 2 | 1 | 0 | 0 | 2 | 6 | 0 | 0 | 0 | 0 | 0 | 0 | 0 | 12 | 12 | |
| | | | | | | | | | | | | | | | 1 | BC is changed over to C− and TK is stepped to t2. |
| − | 2 | 1 | 0 | 0 | 2 | 6 | 0 | 0 | 0 | 0 | 0 | 0 | 0 | 0 | 2 | |
| | | | | | | | | | | | | | | 1 | 2 | 12 is subtracted from 26 in 9R and 8R. 10R does not register 9. |
| − | 2 | 1 | 1 | 0 | 1 | 4 | 0 | 0 | 0 | 0 | 0 | 0 | 0 | 10 | 11 | |
| | | | | | | | | | | | | | | 1 | 2 | 12 is subtracted from 14 in 9R and 8R. 10R does not register 9. |
| − | 2 | 1 | 2 | 0 | 0 | 2 | 0 | 0 | 0 | 0 | 0 | 0 | 0 | 10 | 11 | |
| | | | | | | | | | | | | | | 1 | 2 | 12 is subtracted from 02 in 9R and 8R. |
| − | 2 | 1 | 2 | 9 | 9 | 0 | 0 | 0 | 0 | 0 | 0 | 0 | 0 | 10 | 11 | 10R registers 9 and therefore CC is stepped to 3 and BC is changed over to C+. |
| + | 3 | 1 | 2 | 9 | 9 | 0 | 0 | 0 | 0 | 0 | 0 | 0 | 0 | 0 | 2 | |
| | | | | | | | | | | | | | | 1 | 2 | 12 is added to 90 in 9R and 8R. |
| + | 3 | 1 | 3 | 0 | 0 | 2 | 0 | 0 | 0 | 0 | 0 | 0 | 0 | 10 | 11 | |
| | | | | | | | | | | | | | | 11 | 12 | 99 is added into 12R and 11R. |
| + | 3 | 1 | 2 | 0 | 0 | 2 | 0 | 0 | 0 | 0 | 0 | 0 | 0 | 12 | 1 | |
| | | | | | | | | | | | | | | | 2 | BC is changed over to C− and TK is stepped to t3. |
| − | 3 | 1 | 2 | 0 | 0 | 2 | 0 | 0 | 0 | 0 | 0 | 0 | 0 | 0 | 3 | |
| | | | | | | | | | | | | | | 1 | 3 | 12 is subtracted from 20 in 8R and 7R. 9R does not register 9. |
| − | 3 | 1 | 2 | 1 | 0 | 8 | 0 | 0 | 0 | 0 | 0 | 0 | 0 | 9 | 11 | |
| | | | | | | | | | | | | | | 1 | 3 | 12 is substracted from 08 in 8R and 7R. |
| − | 3 | 1 | 2 | 1 | 9 | 9 | 6 | 0 | 0 | 0 | 0 | 0 | 0 | 9 | 11 | 9R registers 9 and therefore CC is stepped to 4 and BC is changed over to C+. |
| + | 4 | 1 | 2 | 1 | 9 | 9 | 6 | 0 | 0 | 0 | 0 | 0 | 0 | 0 | 3 | |
| | | | | | | | | | | | | | | 1 | 3 | 12 is added to 96 in 8R and 7R. |
| + | 4 | 1 | 2 | 2 | 0 | 0 | 8 | 0 | 0 | 0 | 0 | 0 | 0 | 9 | 11 | |
| | | | | | | | | | | | | | | 10 | 12 | 999 is added into 12R, 11R and 10R. |
| + | 4 | 1 | 2 | 1 | 0 | 0 | 8 | 0 | 0 | 0 | 0 | 0 | 0 | 12 | 2 | |
| | | | | | | | | | | | | | | | 3 | BC is changed over to C− and TK is stepped to t4. |
| − | 4 | 1 | 2 | 1 | 0 | 0 | 8 | 0 | 0 | 0 | 0 | 0 | 0 | 0 | 4 | |
| ----- | ----- | ----- | ----- | ----- | ----- | ----- | ----- | ----- | ----- | ----- | ----- | ----- | ----- | ----- | ----- | ----- |
| | | | | | | | | | | | | | | 1 | 10 | 1 is subtracted from 1 in 1R. |
| − | 10 | 1 | 2 | 1 | 6 | 6 | 6 | 6 | 6 | 6 | 9 | 0 | 0 | 2 | 11 | |
| | | | | | | | | | | | | | | 1 | 10 | 1 is subtracted from 0 in 1R. |
| − | 10 | 1 | 2 | 1 | 6 | 6 | 6 | 6 | 6 | 6 | 8 | 9 | 9 | 2 | 11 | 2R registers 9 and therefore CC is stepped to 11 and BC is changed to C+. |
| + | 11 | 1 | 2 | 1 | 6 | 6 | 6 | 6 | 6 | 6 | 8 | 9 | 9 | 0 | 10 | |
| | | | | | | | | | | | | | | 1 | 10 | 1 is added to 9 in 1R. |
| + | 11 | 1 | 2 | 1 | 6 | 6 | 6 | 6 | 6 | 6 | 9 | 0 | 0 | 2 | 11 | |
| | | | | | | | | | | | | | | 3 | 12 | 9999999999 is added into 12R to 3R. |
| + | 11 | 1 | 2 | 1 | 6 | 6 | 6 | 6 | 6 | 6 | 8 | 0 | 0 | 12 | 9 | |
| | | | | | | | | | | | | | | | 10 | BC is changed to C− and TK is stepped to t11. |
| − | 11 | 1 | 2 | 1 | 6 | 6 | 6 | 6 | 6 | 6 | 8 | 0 | 0 | 0 | 11 | |
| | | | | | | | | | | | | | | 1 | 11 | Gate G5 is opened to allow 9 to be added into each order. Further the off 1 is added to 1R through G4. |
| − | 11 | 1 | 2 | 1 | 6 | 6 | 6 | 6 | 6 | 6 | 8 | 0 | 0 | 12 | 10 | |
| − | 11 | 1 | 2 | 1 | 6 | 6 | 6 | 6 | 6 | 6 | 8 | 0 | 0 | 0 | 11 | The machine stops. |

*Multiplier check*

If desired the machine may be provided with a multiplier check key to enable the operator to check that a multiplication has been performed correctly and to ascertain what digits of the multiplier have been accepted by the machine. The multiplier check keys operates contacts similar to those operated when the machine is set to perform division. The multiplier check key will also operate to reset the timing device TK to *t1* and to remove the negative potential from the start contacts. The machine then divides the product in the register by the multiplicand which was set on the keys. The result is that, if the multiplication has been performed correctly, the multiplier appears in the register. As the machine performs approximations in division similar to those performed in multiplication, the register shows correctly the digits of the multiplier that have been accepted by the machine.

*Decimal points*

The machine may be provided with means for indicating the position of the decimal point in the number in the register. Such means may be similar to those described and claimed in our co-pending application Serial No. 164,645 filed December 29, 1961, which is a continuation-in-part of applications Serial No. 682,376 filed September 6, 1957, now abandoned, Serial No. 682,395 filed September 6, 1957, now abandoned, Serial No. 682,396 filed September 6, 1957, now abandoned, and Serial No. 819,-068 filed June 9, 1959, now abandoned. The decimal point counter can be driven when the terminal M is positive and a multiplier decimal point key is not depressed. Under these conditions the counter is driven forward one step each time the pulse generator PG is stopped, except that means are provided to prevent the counter being driven by the first digit of the multiplier. Thus the decimal point will be moved one step to the right for each digit of the multiplier except the first until the multiplier decimal point key is depressed.

*Clearing*

The machine may be provided with a "clear register" key and a "clear keys" key.

The clear keys key clears the keyboard mechanically and, when it is operated, it closes contacts momentarily to reset the timing device TK to *t1*.

The clear register key also resets the timing device TK to *t1* and it closes two further switches. One of these applies to positive potential to each of the counting devices 1R to 12R causing it to be reset to 0. The other switch applies a negative potential to the various timing devices and bi-stable devices to return them all to their starting conditions.

*Non-shift key*

The machine may also be provided with a "non-shift" key.

The non-shift key is operative during multiplication to disable the gate TG5 so that the timing device TK is not stepped by the energisation of the terminal MR at the end of each multiplication stage. Thus the timing devices TR and TK remain in step and accordingly each successive partial product is added to the accumulated products in the register without shift. For example, if 12 is multiplied by 1 and 2 with the non-shift key depressed the register will give the answer as 36.

Figure 3:
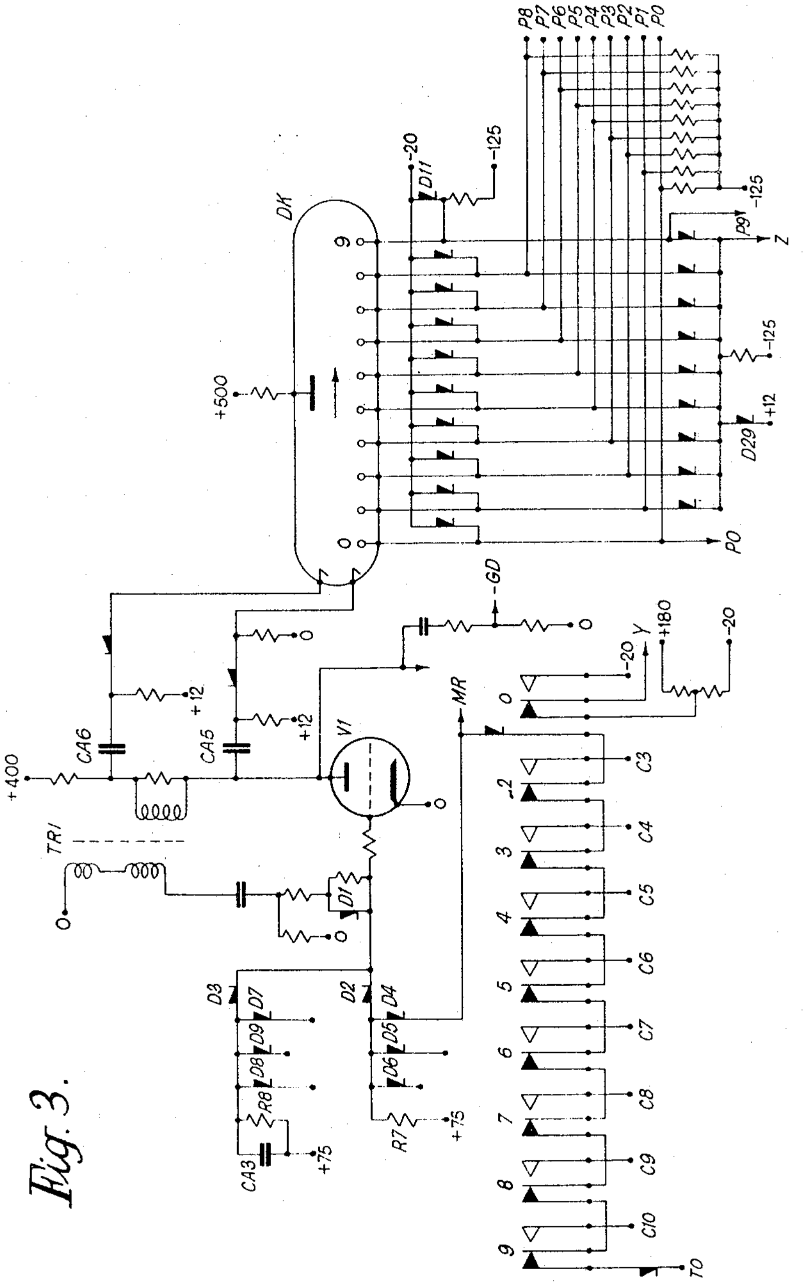
FIGURE 3 is a circuit diagram of a pulse generator for use in a calculating machine as illustrated in FIGURE 1.

FIGURE 3 is a circuit diagram of the pulse generator PG and the bank of multiplier keys. The pulse generator includes a ten-cathode electronic stepping tube DK and a vacuum triode V1. The triode V1 is connected in a conventional blocking oscillator circuit with feed back from anode to grid through the windings of a transformer TR1. The circuit constants are such that the blocking oscillator normally runs at a frequency of four kilocycles per second. When the grid of the valve V1 is at zero potential, the valve will be conducting since the cathode is also held at zero potential. If the grid becomes slightly negative, the negative-going voltage step on the grid is amplified and inverted at the anode. It is again inverted to a negative-going voltage by the transformer TR1 and is applied to the grid of the valve V1 through a capacitor CA1. Thus the grid is made more negative and the valve is cut off. The capacitor CA1 then charges and the voltage on the grid rises until the valve begins to conduct. As a result, the voltage at the anode begins to fall and this change is inverted by the transformer TR1 to a positive-going voltage on the grid which assists the changeover of the valve from the nonconductive to the conductive state. The valve remains in the conductive state while the capacitor CA1 discharges and the initial condition with the grid of the valve at zero potential is again reached. The oscillation of the valve between a conducting and a nonconducting state causes voltage wave forms to be applied to the drive electrodes of the stiffing tube DK through capacitors CA5 and CA6 in a conventional manner.

The stiffing tube DK has ten cathodes and during stiffing of the tube a positive voltage pulse appears at each cathode in turn. The first cathode is connected to two terminals P0, the second cathode to a terminal P1, the third cathode to a terminal P2, and so on. All the cathodes are connected through individual rectifiers to a terminal Z. This terminal is connected through a rectifier B29 to a potential of +12 volts and all the cathodes are also connected through individual rectifiers to a potential of −20 volts. Finally all the cathodes are connected through individual high-resistance resistors to a potential of −125 volts. This arrangement serves to ensure that the pulses on the cathodes have good rectangular shape as explained in our co-pending application Serial No. 24,481 of 1959.

The control grid of the valve V1 is connected through rectifiers D2 and D3 to two gate circuits, one of which constitutes the gate circuit SG1 illustrated in FIGURE 1 and the other of which constitutes the gate circuit SG2. The gate circuit SG2 includes a resistor R7 and diodes D4, D5 and D6. The anode of the rectifier D2 is connected through the rectifier D4 to the terminal MR, through the rectifier D5 to the terminal ST3, through the rectifier D6 to the terminal M and through the resistor R7 to a potential of +75 volts. The gate circuit SG1 includes a capacitor CA3, a resistor R8 and diode rectifiers D7, D8 and D9. The anode of the rectifier D3 is connected through the capacitor CA3 and the resistor R8 in parallel to a potential of +75 volts, through the rectifier D7 to the terminal ST3, through the rectifier D8 to the terminal T0 and through the rectifier D9 to the terminal *t11*. In the normal way these two gate circuits have substantially no effect on the operation of the valve V1 as a blocking oscillator, but if positive potentials are applied to all three inputs of either gate circuit, the grid of the valve V1 will be prevented from going negative, with the result that the valve will be maintained in the conductive state and oscillation will cease. The capacitor CA3 in the gate circuit SG1 ensures that there is a slight delay after the oscillator has been stopped before it restarts.

The multiplier keys are connected through a rectifier D14 to the terminal MR, and it will be seen that when no multiplier key is depressed the terminal T0 of the timer TR is connected through the rectifier D14 to the rectifier D4 in the gate SG2. When one of the multiplier keys 2 to 9 is depressed a respective one of the terminals C3 to C10 of the control counter CC will be connected to the terminal MR in place of the terminal T0. Further it will be seen that the terminal Y is normally connected to a positive potential, but when the 0 multiplier key is depressed, the terminal Y is connected to a potential of −20 volts. When the 1 multiplier key not shown in FIGURE 3 is depressed, in the bank of multiplier keys the various start contacts are closed, but no connections are charged.

Figure 4:
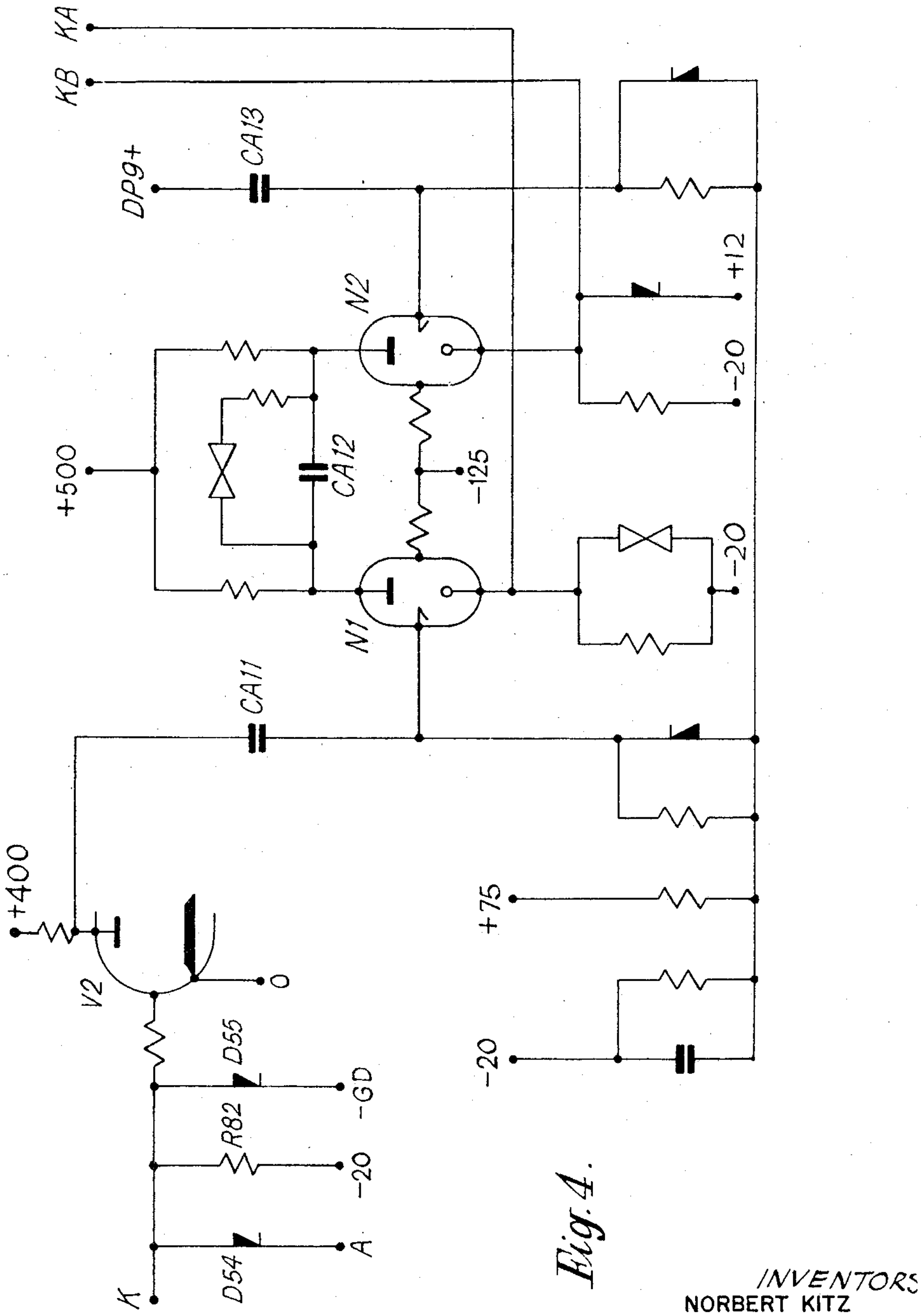
FIGURE 4 is a circuit diagram of a two-state device for use in a calculating machine as illustrated in FIGURE 1.

FIGURE 4 is a circuit diagram of the bistable device KC and its associated components. The bistable device KC includes a pair of trigger tubes N1 and N2 and the terminals KA and KB are connected respectively to the cathodes of these two trigger tubes. In the rest state the trigger tube N2 is conducting and the trigger tube N1 is nonconducting. Thus the terminal KA is normally negative and the terminal KB is positive. The control electrode of the trigger tube N1 is connected through a capacitor CA11 to the anode of a vacuum triode V2. The control grid of this triode is connected to the output of the gate circuit KD1 (FIGURE 1) which is constituted by the diode rectifiers D54 and D55, and a resistor R82. Provided the terminal A is positive a pulse on the line K will be inverted by the valve V2 and differentiated by a differentiating circuit including the capacitor CA11. The valve V2 conducts for the duration of the pulse, and discharges the capacitor CA11. After the end of the pulse CA11 commences to recharge and in doing so causes V1 to conduct. This causes a drop of potential at the anode of the trigger tube N1, which change of potential is transferred to the anode of the trigger tube N2, through a capacitor CA12. As a result the trigger tube N2 ceases to conduct, and the polarities of the two output terminals KA and KB are thus reversed.

Since the device KC is bistable, it remains in this condition until the end of a timing period, when a P9 pulse is applied through a differentiating and inverting circuit KD2 (FIGURE 1) to a terminal DP9+ and thence through a capacitor CA13 to the trigger electrode of the trigger tube N2. This pulse causes the capacitor CA13 to discharge and after the end of the pulse the recharging of the capacitor CA13 causes the trigger tube N2 to become conductive. The trigger tube N1 is rendered nonconductive as a result of the anode coupling through the capacitor CA12. Thus the bistable device KC is restored to its original state with the output terminal KA negative and the output terminal KB positive.

It will be seen that the cathode of the diode rectifier D55 is connected to a terminal —GD, and it will also be seen that there is a similarly labelled terminal connected through a capacitor and a resistor to the anode of the valve V1 shown in FIGURE 3. The potential of the anode V1 will be moving in a negative direction at the time when the gate circuit KG1 is to be closed and accordingly this additional input to the gate assists in the rapid closing thereof, in the manner described and claimed in our co-pending application Ser. No. 8,502 of 1960.

Figure 5:
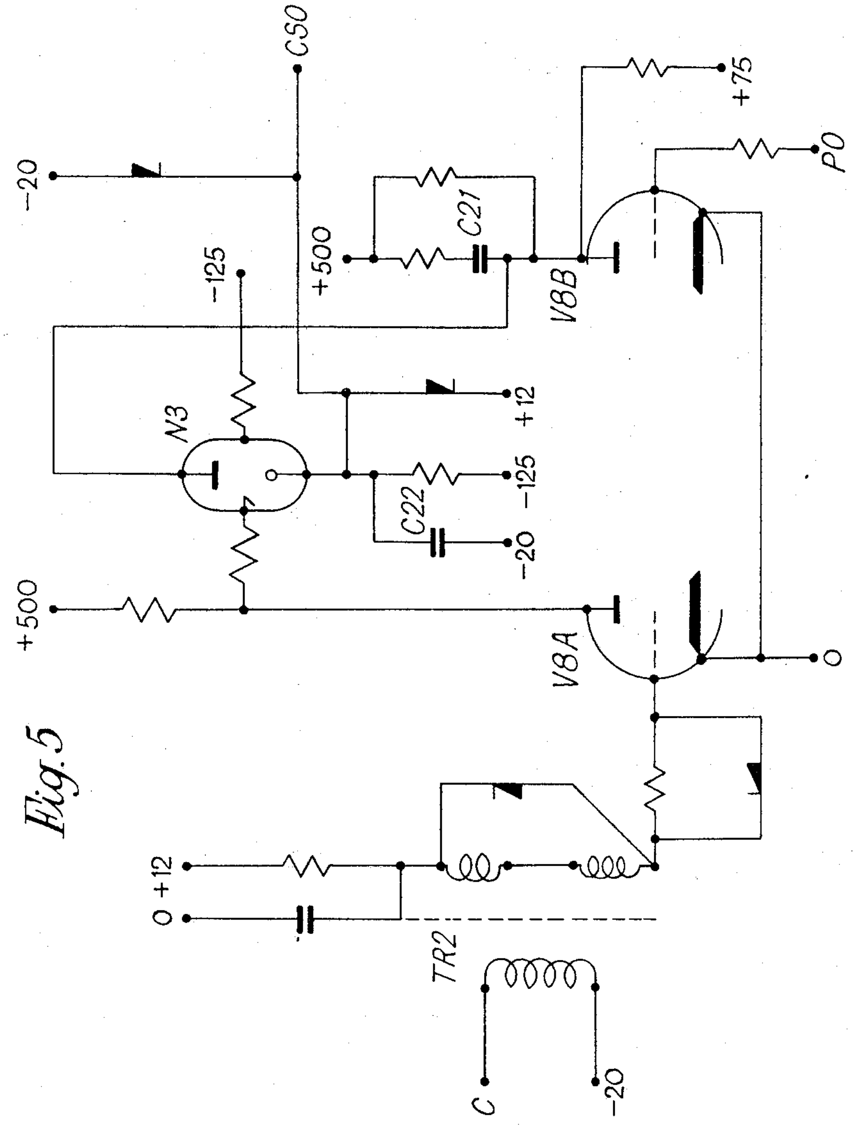
FIGURE 5 is a circuit diagram of a carry store for use in a calculating machine as illustrated in FIGURE 1.

FIGURE 5 is a circuit diagram of the carry store CS shown in FIGURE 1. The carry store comprises two halves of a double-triode valve V8A and V8B and a gas-filled trigger tube N3. In the unset, or normal state the triode V8A is conductive and the triode V8B and the trigger tube N3 are non-conductive. The carry store is changed to the set state if a positive carry pulse is applied to the input terminal C. The carry pulse is changed to a negative pulse by a transformer TR2 and this negative pulse cuts off the triode V8A for a short time. As a result the anode of V8A becomes more positive and, since this anode is connected to the trigger electrode of the trigger tube N3, this trigger tube is fired. The cathode of the trigger N3 thus becomes positive and this positive potential is applied to the terminal CS0 and thence to the gate G9 (FIGURE 1). The P0 pulse which occurs at the beginning of the next timing period is thus passed through the gate G9 to the gate G10. The same P0 pulse is applied to the grid of the triode V8B which is normally in a non-conducting state. As a result triode V8B becomes conductive and a negative pulse appears on its anode. This pulse is applied to the anode of the trigger tube N3 returning it to its nonconducting state, and thereby resetting the carry store to its unset state.

It is clear that, since the same P0 pulse must be passed through the gate G9 and is also used for returning the carry store to its unset state, there must be a sufficient delay introduced in the return of the carry store to its unset state, to allow the P0 pulse to pass through the gate G9 without distortion. This required delay is introduced partly by a capacitor C22, which is connected between the terminal CS0 and a potential of —20 volts, partly by a capacitor C21 which is connected through a resistor between the anode of the valve V8B and a potential of +500 volts, and partly by the remanent ionisation of the trigger tube N3.

The circuit arrangements of the other devices shown in FIGURE 1 may be generally of a conventional nature and accordingly are not described herein in detail.

What we claim as our invention and desire to secure by Letters Patent of the United States is:

1. A calculating machine including a plurality of pulse-operated counting devices, a plurality of orders of keys, an electric pulse generator, and first and second timing devices, wherein the first timing device enables the pulse generator to be controlled by the orders of keys in sequence, wherein the second timing device enables the pulse generator to apply pulses to the counting device in sequence, and wherein means are provided for altering the relative timing of the first and second timing devices, whereby each order of keys may be used to control the application of pulses to a plurality of different counting devices.

2. A calculating machine including a plurality of orders of keys, a plurality of key gates one associated with each order of keys, a plurality of counting devices, a plurality of counting device gates, one associated with each counting device, an electric pulse generator, a first timing device operative to open said key gates in sequence, a second timing device operative to open said counting device gates in sequence, and a common pulse entry line, wherein the actuation of a key in any order causes a number of pulses related to the value of the actuated key to be applied to the common entry line by the pulse generator while the key gate associated with the order of the actuated key is open, and wherein during a cycle of operation of the machine the content of each counting device is increased in dependence on the number of pulses appearing on the common entry line while the counting device gate associated with that counting device is open.

3. A calculating machine as claimed in claim 2, including means for stepping the first and second timing devices.

4. A calculating machine as claimed in claim 3, wherein one pulse from the pulse generator is operative during each cycle of operation of the pulse generator to move each timing device forward one step.

5. A calculating machine as claimed in claim 4, wherein the first timing device completes one cycle of operation in a number of steps which is one less than the number of steps required to complete a cycle of operation of the second timing device.

6. A calculating machine as claimed in claim 5, including means which normally prevent the first timing device from being stepped when the second timing device is on its first step.

7. A calculating machine as claimed in claim 6, including means for applying an additional driving pulse to the first timing device while the second timing device is on its first step.

8. A calculating machine as claimed in claim 7, arranged to perform multiplication and including means for applying the additional driving pulse to the first timing device after each partial product has been formed by the multiplication of a multiplicand by one digit of a multiplier.

9. A calculating machine including a plurality of groups of keys each group representing a denominational order and each key representing a digit, a plurality of counting devices each representing a denominational order, means for associating the groups of keys with counting devices representing successively lower denominational orders during successive cycles of operation of the machine, means for supplying to each counting device during each cycle of operation of the machine a number of electrical pulses related to the digit represented by any actuated key in the group of keys associated with that counting device during that cycle of operation of the machine, and means for inhibiting the supply of the pulses to any counting device which is associated with a group of keys representing a denominational order lower than the order represented by that counting device.

10. A calculating machine including a plurality of groups of latched keys each group representing a denominational order and each key representing a digit, a plurality of electric-pulse-operated counting devices each representing a denominational order, an electric pulse generator, and a single bank of multiplier keys, wherein the machine is operative to multiply by repetitive addition a multiplicand entered on said orders of latched keys by a multiplier digit entered in the bank of multiplier keys, wherein, when the first digit of the multiplier is entered in the multiplier keys, each group of keys is operative to control the number of pulses applied to the counting device representing the same denominational order as that group of keys, and wherein when the second digit of the multiplier is entered in the multiplier keys, the group of keys representing the lowest denominational order is rendered inoperative, and each other group of keys is operative to control the number of pulses applied to the counting device representing the denominational order below that represented by that group of keys.

11. A calculating machine as claimed in claim 10, including means for preventing the machine from accepting further digits of the multiplier after the highest order group of keys has been associated with the lowest order counting device.

12. A calculating machine including a multidenominational register, a plurality of groups of keys each group representing a denominational order and each key representing a digit, a plurality of gates one associated with each group of keys, means for controlling said gates so that each group of keys is connected in sequence for a respective predetermined period to a common key line, and a pulse generator for producing during each of said predetermined periods a series of time-displaced pulses each of which appears on a respective different output terminal of the pulse generator, means connecting each of said output terminals to a respective one of the keys in each group so that, when any key is actuated, a control pulse, the timing of which within said series is indicative of the digit represented by that key, is applied during the respective predetermined period of the common key line, a two-state device controlled by said common key line so that it is set by a control pulse on the key line and is unset at the end of each of said predetermined periods, and means controlled by said two-state device for entering pulses into the register in dependence on the time position of each control pulse within its respective predetermined period.

13. A calculating machine for performing division, said machine including a plurality of first counting devices each representing a denominational order, second and third counting devices for generating a quotient digit, said second and third counting devices representing respectively the two orders next above the highest order represented by the first counting devices, carry means between adjacent ones of all said counting devices, means for entering a dividend into the first counting devices of highest denominational order, storage means, means for entering a divisor into said storage means, means for performing repeated subtraction of the divisor in said storage means from the dividend in said first counting devices, means for ascertaining when the second counting device registers nine, means responsive to ascertainment that the second counting device reads nine for adding the divisor back once to the dividend remainder, and means for thereafter subtracting one from the number registered by the third counting device.

14. A calculating machine as claimed in claim 13, including means for shifting the divisor successively to the right with respect to the dividend remainder.

15. A calculating machine including a multidenominational register, a plurality of groups of keys each representing a denominational order and each key representing a digit, a plurality of gates one associated with each group of keys, a common key line, means for controlling said gates so that each group of keys is connected in sequence for a respective predetermined period to said common key line, a pulse generator having a plurality of output terminals each of which is connected to one of the keys in each group and arranged to produce during each of said predetermined periods a series of time-displaced pulses each of which appears on a respective different one of said output terminals, a two-state device set by a control pulse on the common key line and unset at the end of each of said predetermined periods, and means controlled by said two-state device for entering pulses into said register.

16. A calculating machine including a plurality of pulse controlled counters arranged as a multidenominational register, a plurality of groups of keys each group representing a denominational order and each key representing a digit, a common key line, a plurality of gates each adapted to couple a respective one of said orders of keys to said common key line, an electric timing device arranged to render the said gates conductive for successive periods of time, a pulse generator adapted to produce during each of said periods of time a series of time-displaced pulses each of which appears on a respective different output terminal of the pulse generator, means connecting at least some of said output terminals to respective ones of the keys in each group, a bi-stable trigger circuit set by a control pulse on said common key line and unset by a pulse from said pulse generator at the end of each of said periods of time, and means controlled by said bi-stable trigger circuit for entering pulses into said counters in dependence on the time position of each control pulse within its respective period of time.

17. A calculating machine as claimed in claim 16, including delay means effective to ensure that the bistable trigger circuit is set by the trailing edge of the control pulse.

18. A calculating machine as claimed in claim 15, including further delay means effective to ensure that the bistable trigger circuit is unset by the trailing edge of the last pulse produced by the pulse generator during each of said periods of time.

19. A calculating machine for performing multiplication, including a plurality of groups of keys each group representing a denominational order and each key representing a digit, a plurality of pulse-controlled counters each representing a denominational order, means for associating the groups of keys with counters representing successively lower denominational orders during successive stages of a multiplication, means for supplying to each counter during each stage of the multiplication a number of electrical pulses determined by the product of the respective digit of the multiplier and the digit represented by any actuated key in the group of keys associated with that counter during that stage, and means for inhibiting the supply of pulses whenever a group of keys is associated with a counter representing a denominational order higher than the order represented by the counter with which that group of keys was associated during the first multiplication stage.

20. A calculating machine as claimed in claim 19, including a common key line, means for connecting said common key line to the groups of keys in sequence, a first two-state device which controls the application of pulses to said counters, a gate circuit adapted to connect the common key line to the input of said first two-state device, a second two-state device controlling said gate circuit so that it is conductive when the second two-state device is unset and is non-conductive when the second two-state device is set, and means for setting said second two-state device at a time which is later than the time when the group of keys representing the highest denominational order has been connected to said common key line but earlier than the time when the group of keys representing the lowest denominational order is next connected to said common key line.

21. A calculating machine for performing a plurality of arithmetical functions, including a plurality of electric pulse-controlled counters arranged to form a register, a common pulse entry line, a plurality of first gate circuits each adapted to connect an individual one of said counters to said common pulse entry line, an electric timer adapted to render said first gate circuits conductive in sequence, a pulse generator, a plurality of second gate circuits, means for supplying selected numbers of pulses from said pulse generator through said second gate circuits to said common pulse entry line, a plurality of switches adapted to select the arithmetical function to be performed by the machine, a plurality of terminals the potentials of which are controlled by said switches, and means connecting at least one input of each of said second gate circuits to one of said plurality of terminals.

22. A calculating machine for performing a plurality of arithmetical functions, including a plurality of electric pulse-controlled counters arranged to form a register, a common pulse entry line, a plurality of first gate circuits each adapted to connect an individual one of said counters to said common pulse entry line, an electric timer adapted to render said first gate circuits conductive in sequence, a pulse generator, a plurality of second gate circuits, means for supplying selected numbers of pulses from said pulse generator through said second gate circuits to said common pulse entry line, a plurality of switches adapted to select the arithmetical function to be performed by the machine, a first terminal energised when the machine is set to perform addition, subtraction or multiplication, a second terminal energised when the machine is set to perform division, a third terminal energised when the machine is set to perform addition, multiplication or division, a fourth terminal energised when the machine is set to perform subtraction or negative multiplication, and means connecting at least one input of each of said second gate circuits to one of said terminals.

23. A calculating machine as claimed in claim 22, including a zero multiplier key, a fifth terminal which is energised at all times except when said zero multiplier key is depressed, a two-state device the first output of which is energised when the two-state device is set, and means for setting the two-state device in dependence on the number of pulses to be applied to said common pulse entry line, wherein a first one of said second gate circuits has a first input connected to said first terminal, a second input connected to said third terminal, a third input connected to an output of said pulse generator on which nine pulses appear during each cycle of operation of said pulse generator, a fourth input connected to said first output of said two-state device, and a fifth input connected to said fifth terminal.

24. A calculating machine as claimed in claim 22, including a zero multiplier key, a fifth terminal which is energised at all times except when said multiplier key is depressed, a two-state device a second output of which is energised when said two-state device is unset, means for setting the two-state device in dependence on the number of pulses to be applied to said common pulse entry line, wherein a first one of said second gate circuits has a first input connected to said first terminal, a second input connected to said third terminal, a third input connected to an output of said pulse generator on which nine pulses appear during each cycle of operation of said pulse generator, a fourth input connected to said first output of said two-state device and a fifth input connected to said fifth terminal, and wherein a second one of said gate circuits has a first input connected to said first terminal, a second input connected to said fourth terminal, a third input connected to the output of said pulse generator on which nine pulses appear during each cycle of operation of the pulse generator, a fourth input connected to said second output of said two-state device and a fifth input connected to said fifth terminal.

25. A calculating machine as claimed in claim 22, including a zero multiplier key, a fifth terminal which is energised at all times except when said multiplier key is depressed, wherein a first one of said second gate circuits has a first input connected to said first terminal, a second input connected to said third terminal, a third input connected to an output of said pulse generator on which nine pulses appear during each cycle of operation of said pulse generator, a fourth input connected to said first output of said two-state device, and a fifth input connected to said fifth terminal, wherein a second one of said gate circuits has a first input connected to said first terminal, a second input connected to said fourth terminal, a third input connected to the output of said pulse generator on which nine pulses appear during each cycle of operation of the pulse generator, a fourth input connected to said second output of said two-state device and a fifth input connected to said fifth terminal, and wherein a third one of said gate circuits has a first input connected to said first terminal, a second input connected to said fourth terminal, a third input connected to an output of said electric timer which is energised when the counter representing the lowest order in the register is connected to said common pulse entry line, a fourth input connected to an output of said pulse generator on which one pulse appears during each cycle of operation of said pulse generator and a fifth input connected to said fifth terminal.

26. A calculating machine as claimed in claim 22, wherein a first one of said second gate circuits has a first input connected to said first terminal, a second input connected to said third terminal, a third input connected to an output of said pulse generator on which nine pulses appear during each cycle of operation of said pulse generator, a fourth input connected to said first output of said two-state device, and fifth input connected to said fifth terminal, wherein a second one of said gate circuits has a first input connected to said first terminal, a second input connected to said fourth terminal, a third input connected to the output of said pulse generator on which nine pulses appear during each cycle of operation of the pulse generator, a fourth input connected to said second output of said two-state device and a fifth input connected to said fifth terminal, wherein a third one of said gate circuits has a first input connected to said first terminal, a second input connected to said fourth terminal, a third input connected to an output of said electric timer which is energised when the counter representing the lowest order in the register is connected to said common pulse entry line, a fourth input connected to an output of said pulse generator on which one pulse appears during each cycle of operation of said pulse generator and a fifth input connected to said fifth terminal, and wherein a fourth, a fifth, a sixth, and a seventh one of said gate circuits each has a first input connected to said second terminal, wherein said fourth one of said gate circuits is operative during subtraction cycles to add the nines complement of a divisor to a dividend stored in said counters, wherein the seventh one of said gate circuits is operative to add the odd one to said dividend, wherein said fifth one of said gate circuits is operative during add-back to add the divisor to the dividend, and wherein said sixth one of said gate circuits is operative during add-back to subtract unity from the quotient.

27. A calculating machine for performing division, including a plurality of first decimal counting devices each representing a denominational order of a register, carry means between adjacent ones of said first counting devices, means for entering a dividend into said counting devices, means for performing by complementary additions repeated subtraction of a divisor from the dividend, a second counting device receiving carries from the highest order first counting device and having nine added in for each of said subtractions, a third counting device receiving carries from said second counting device, means for ascertaining when said second counting device does not receive a carry from said highest order first counting device, means for thereafter adding the divisor back once to the dividend remainder, and means to subtract unity from the number in the said third counting device, whereby said third counting device registers the first digit of the quotient.

28. A calculating machine as claimed in claim 27, including means for shifting the divisor successively to the right with respect to the dividend remainder, so that after the first of said shifts the highest order first counting device assumes the function of said second counting device and the said second counting device assumes the function of the said third counting device, whereby the second digit of the quotient appears in said second counting device.

29. A calculating machine as claimed in claim 27, including a control counter having a plurality of output terminals energised in succession as the counter is stepped, and a plurality of gate circuits each having one of its inputs connected to a respective one of said output terminals and the other of its inputs connected so that it is energised when a respective one of the counting devices registers nine.

30. A calculating machine for performing division, including a plurality of first decimal counting devices each representing a denominational order of a register, carry means between adjacent ones of said first counting devices, means for entering a dividend into said counting devices, means for performing by complementary additions repeated subtraction of a divisor from the dividend, a second counting device receiving carries from the highest order first counting device and having nine added in for each of said subtractions, a third counting device receiving carries from said second counting device, means for ascertaining when said second counting device does not receive a carry from said highest order first counting device, means for thereafter adding the divisor back once to the dividend remainder, means to subtract unity from the number in the said third counting device, whereby said third counting device registers the first digit of the quotient, means for shifting the divisor successively to the right with respect to the dividend remainder, so that after the first of said shifts the highest order first counting device assumes the function of said second counting device and the said second counting device assumes the function of the said third counting device, whereby the second digit of the quotient appears in said second counting device, a control counter having a plurality of output terminals energised in succession as the counter is stepped, and a plurality of gate circuits each having one of its inputs connected to a respective one of said output terminals and the other of its inputs connected so that it is energised when a respective one of the counting devices registers nine, wherein the first output terminal of said control counter is connected to the one input of the gate circuit, the other input of which is energised by the second counting device, wherein the second output terminal of the control counter is connected to the one input of the gate circuit, the other input of which is energised by the highest order first counting device, and wherein the last output terminal of the control counter is connected to the one input of the gate circuit, the other input of which is energised by the next to lowest order first counting device.

31. A calculating machine as claimed in claim 30, wherein the control counter is stepped when both inputs of any one of said gate circuits are energised.

32. A calculating machine as claimed in claim 30, including a two-state device which is set each time the control counter is stepped and is unset when a shift takes place, and which is operative when set to cause the divisor to be added to the dividend (or dividend remainder) and when unset to cause the divisor to be subtracted from the dividend (or dividend remainder).

33. A calculating machine including a plurality of electric pulse-operated counting devices arranged to form a register, a plurality of groups of multiplicand keys, each group representing a denominational order and each key representing a digit, a plurality of multiplier keys each representing a digit, means for adding into said register a number of times determined by the actuation of any one of said multiplier keys a multiplicand entered on said multiplicand keys the position of entry into said register being shifted one place for each actuation of a multiplier key, so that the product of the multiplicand on the multiplicand keys and the multiplier represented by the successively actuated multiplier keys is entered in the register, and a multiplier check key operative when actuated to cause the machine to divide the product in the register by the multiplicand on the multiplicand keys and to enter the dividend into the register in place of said product.

34. A calculating machine including a register, a plurality of groups of digit keys, a plurality of key gates one associated with each group of keys, a common key line, means for controlling said key gates so that each group of keys is connected in sequence for a respective predetermined period of time to said common key line, a plurality of first pulse output terminals, a second pulse output terminal, means for producing a series of time-displaced pulses of which individual pulses appear in succession on respective ones of said first pulse output terminals and a plurality of which appears on said second pulse output terminal, a bistable trigger circuit, first and second gate circuits each having at least two input terminals and an output terminal, means connecting one input of each of said gate circuits to the second pulse output terminal, means for energizing the other said input terminal of the first of said gate circuits when the trigger circuit is set, means for energizing the other said input terminal of the second of said gate circuits when the trigger circuit is unset, means connecting each of said first pulse output terminals to a respective one of the keys in each group so that when any key is actuated a pulse from the first pulse output terminal connected to that key is applied during the respective period of time to the common key line, means coupling the trigger circuit to the common key line so that the trigger circuit is set by said pulse on the common key line, means for unsetting the trigger circuit at the end of each of said predetermined periods of time, and means for coupling the output terminals of said gate circuits to said register.

References Cited by the Examiner

UNITED STATES PATENTS

| | | | |
|---|---|---|---|
| 2,346,616 | 4/1944 | Saxby | 235—156 |
| 2,398,150 | 4/1946 | Mumma et al. | 235—156 |
| 2,459,862 | 1/1949 | Avery | 235—160 |
| 2,585,630 | 2/1952 | Crosman | 235—156 |
| 2,665,441 | 1/1954 | Frady | 235—156 |
| 2,775,403 | 12/1956 | Hall et al. | 235—160 |
| 2,840,705 | 6/1958 | Scully | 235—156 |
| 2,916,211 | 12/1959 | Schulze et al. | 235—160 |

(Other references on following page)

UNITED STATES PATENTS

| | | | |
|---|---|---|---|
| 2,919,854 | 1/1960 | Singman | 235—153 |
| 2,930,529 | 3/1960 | Laboissiere | 235—160 |
| 2,934,677 | 4/1960 | Faulkner | 315—84.5 |
| 2,936,116 | 5/1960 | Adamson et al. | 235—173 |
| 2,944,738 | 7/1960 | Maron et al. | 235—156 |
| 2,954,167 | 9/1960 | Williams | 235—160 |
| 2,960,623 | 11/1960 | Adelaar | 315—84.5 |
| 2,968,744 | 1/1961 | Kroupa | 315—84.5 |
| 3,033,455 | 5/1962 | Sierra | 235—160 |
| 3,047,227 | 7/1962 | Thomas et al. | 235—160 |
| 3,067,938 | 12/1962 | Springer | 235—156 |
| 3,084,285 | 4/1963 | Bell et al. | 235—160 |
| 3,104,316 | 9/1963 | Allen et al. | 235—160 |
| 3,196,260 | 7/1965 | Pugmire | 235—175 |

FOREIGN PATENTS 499,900 1/1939 Great Britain.

MALCOLM A. MORRISON, *Primary Examiner.*

ROBERT C. BAILEY, *Examiner.*

M. A. LERNER, *Assistant Examiner.*